United States Patent
Gleeson et al.

(10) Patent No.: US 8,603,239 B2
(45) Date of Patent: Dec. 10, 2013

(54) FIBER CEMENT BUILDING MATERIALS WITH LOW DENSITY ADDITIVES

(75) Inventors: James A. Gleeson, Alta Loma, CA (US); Kalynne H. Paradis, Rancho Cucamonga, CA (US); Brian P. Sloane, Old Toongabbie (AU); David L. Melmeth, Upland, CA (US); Dean M. Seligman, Mission Viego, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 13/455,980

(22) Filed: Apr. 25, 2012

(65) Prior Publication Data

US 2012/0260827 A1    Oct. 18, 2012

Related U.S. Application Data

(63) Continuation of application No. 12/802,346, filed on Jun. 7, 2010, now Pat. No. 8,182,606, which is a continuation of application No. 12/039,372, filed on Feb. 28, 2008, now Pat. No. 7,727,329, which is a continuation of application No. 10/414,505, filed on Apr. 15, 2003, now Pat. No. 7,658,794, which is a continuation of application No. 09/803,456, filed on Mar. 9, 2001, now Pat. No. 6,572,697.

(60) Provisional application No. 60/189,235, filed on Mar. 14, 2000.

(51) Int. Cl.
    *C04B 14/04* (2006.01)
(52) U.S. Cl.
    USPC ........ 106/705; 106/726; 106/737; 428/307.3; 428/703; 52/344

(58) Field of Classification Search
    USPC .......... 428/307.3, 703; 52/344; 106/705, 644, 106/726, 737
    See application file for complete search history.

(56) References Cited

U.S. PATENT DOCUMENTS

| 815,801 | A | 3/1906 | Depew et al. |
| 1,571,048 | A | 1/1926 | Garrow |
| 1,819,093 | A | 8/1931 | Hardinge |
| 1,914,163 | A | 6/1933 | Randall |

(Continued)

FOREIGN PATENT DOCUMENTS

| AR | 206788 | 8/1976 |
| AR | 206890 | 8/1976 |

(Continued)

OTHER PUBLICATIONS

DE 3046405 Quante Sep. 9, 1982 abstract only.

(Continued)

*Primary Examiner* — Paul Marcantoni
(74) *Attorney, Agent, or Firm* — Knobbe Martens Olson & Bear, LLP

(57) ABSTRACT

This invention relates to a formulation with the addition of low density additives of volcanic ash, hollow ceramic microspheres or a combination of microspheres and volcanic ash or other low density additives into cementitious cellulose fiber reinforced building materials. This formulation is advantageously lightweight or low density compared as compared to current fiber cement products without the increased moisture expansion and freeze-thaw degradation usually associated with the addition of lightweight inorganic materials to fiber cement mixes. The low density additives also give the material improved thermal dimensional stability.

5 Claims, 4 Drawing Sheets

(56) References Cited

U.S. PATENT DOCUMENTS

| | | |
|---|---|---|
| 2,024,689 A | 12/1935 | Walter et al. |
| 2,030,383 A | 2/1936 | Luth et al. |
| 2,054,854 A | 9/1936 | Dreyfus |
| 2,156,308 A | 5/1939 | Schuh |
| 2,156,311 A | 5/1939 | Schuh |
| 2,175,568 A | 10/1939 | Haustein |
| 2,175,569 A | 10/1939 | Kennedy |
| 2,176,668 A | 10/1939 | Egeberg et al. |
| 2,377,484 A | 6/1945 | Elmendorf |
| 2,619,776 A | 12/1952 | Potters |
| 2,645,576 A | 7/1953 | Bate et al. |
| 2,676,892 A | 4/1954 | McLaughlin |
| 2,746,735 A | 5/1956 | Bradford |
| 2,762,619 A | 9/1956 | Booth |
| 2,782,018 A | 2/1957 | Bradford |
| 2,797,201 A | 6/1957 | Veatch |
| 2,838,881 A | 6/1958 | Plumat |
| 2,879,171 A | 3/1959 | Kullenberg |
| 2,880,101 A | 3/1959 | Ulfstedt |
| 2,945,326 A | 7/1960 | Wood |
| 2,947,115 A | 8/1960 | Wood |
| 2,978,339 A | 4/1961 | Veatch et al. |
| 2,978,340 A | 4/1961 | Veatch et al. |
| 2,987,408 A | 6/1961 | Minnick |
| 2,997,403 A | 8/1961 | Searight |
| 3,010,177 A | 11/1961 | Thompson et al. |
| 3,081,179 A | 3/1963 | Charvat et al. |
| 3,150,947 A | 9/1964 | Bland |
| 3,256,105 A | 6/1966 | Alford |
| 3,264,125 A | 8/1966 | Bourlin |
| 3,279,905 A | 10/1966 | Wood et al. |
| 3,293,014 A | 12/1966 | Callender et al. |
| 3,321,414 A | 5/1967 | Vieli |
| 3,341,314 A | 9/1967 | Vukasovich et al. |
| 3,348,956 A | 10/1967 | Ekdahl |
| 3,360,392 A | 12/1967 | Mod et al. |
| 3,365,315 A | 1/1968 | Beck et al. |
| 3,495,961 A | 2/1970 | Lange |
| 3,501,324 A | 3/1970 | Kubo |
| 3,560,185 A | 2/1971 | Nylander |
| 3,560,186 A | 2/1971 | Nylander |
| 3,679,446 A | 7/1972 | Kubo |
| 3,716,386 A | 2/1973 | Kempster |
| 3,736,162 A | 5/1973 | Chvalovsky et al. |
| 3,748,100 A | 7/1973 | Forseth |
| 3,748,160 A | 7/1973 | Carbajal |
| 3,752,685 A | 8/1973 | Honda et al. |
| 3,753,749 A | 8/1973 | Nutt |
| 3,782,985 A | 1/1974 | Gebhardt |
| 3,804,058 A | 4/1974 | Messenger |
| 3,836,412 A | 9/1974 | Boustany et al. |
| 3,838,998 A | 10/1974 | Matthews et al. |
| 3,843,380 A | 10/1974 | Beyn |
| 3,847,633 A | 11/1974 | Race |
| 3,865,779 A | 2/1975 | Oya et al. |
| 3,873,025 A | 3/1975 | Qvarnstrom |
| 3,873,475 A | 3/1975 | Pechacek et al. |
| 3,877,918 A | 4/1975 | Cerbo |
| 3,887,386 A | 6/1975 | Majumdar et al. |
| 3,888,957 A | 6/1975 | Netting et al. |
| 3,902,911 A | 9/1975 | Messenger |
| 3,904,377 A | 9/1975 | Honda et al. |
| 3,904,424 A | 9/1975 | Aoki et al. |
| 3,909,283 A | 9/1975 | Warnke |
| 3,918,981 A | 11/1975 | Long |
| 3,924,901 A | 12/1975 | Phillips |
| 3,931,069 A | 1/1976 | Lundin |
| 3,932,275 A | 1/1976 | Mewes et al. |
| 3,954,390 A | 5/1976 | Akhundov et al. |
| 3,969,567 A | 7/1976 | Occleshaw et al. |
| 3,998,944 A | 12/1976 | Long |
| 4,002,482 A | 1/1977 | Coenen et al. |
| 4,003,752 A | 1/1977 | Isohata et al. |
| 4,009,135 A | 2/1977 | Harreus et al. |
| 4,013,480 A | 3/1977 | Chumbley et al. |
| 4,040,851 A | 8/1977 | Ziegler |
| 4,046,548 A | 9/1977 | Wood et al. |
| 4,052,220 A | 10/1977 | Turpin, Jr. |
| 4,057,908 A | 11/1977 | Mirliss et al. |
| 4,059,423 A | 11/1977 | DeVos |
| 4,066,723 A | 1/1978 | King et al. |
| 4,070,199 A | 1/1978 | Downing et al. |
| 4,088,804 A | 5/1978 | Cornwell et al. |
| 4,098,701 A | 7/1978 | Burrill et al. |
| 4,101,335 A | 7/1978 | Barrable |
| 4,102,697 A | 7/1978 | Fukuba et al. |
| 4,102,773 A | 7/1978 | Green et al. |
| 4,111,713 A | 9/1978 | Beck |
| 4,131,480 A | 12/1978 | McCurrich et al. |
| 4,131,638 A | 12/1978 | Whitaker et al. |
| 4,132,555 A | 1/1979 | Barrable et al. |
| 4,133,854 A | 1/1979 | Hendricks |
| 4,134,773 A | 1/1979 | Simeonov et al. |
| 4,138,313 A | 2/1979 | Hillstrom et al. |
| 4,144,121 A | 3/1979 | Otouma et al. |
| 4,153,439 A | 5/1979 | Tomic et al. |
| 4,161,389 A | 7/1979 | Staffin et al. |
| 4,162,924 A | 7/1979 | Kubo et al. |
| 4,166,749 A | 9/1979 | Sterrett et al. |
| 4,177,176 A | 12/1979 | Burrill et al. |
| 4,184,906 A | 1/1980 | Young et al. |
| 4,188,231 A | 2/1980 | Valore |
| 4,204,644 A | 5/1980 | Kozuka |
| 4,205,992 A | 6/1980 | Mogensen et al. |
| 4,217,335 A | 8/1980 | Sasaki et al. |
| 4,222,785 A | 9/1980 | Henderson |
| 4,225,383 A | 9/1980 | McReynolds |
| 4,226,841 A | 10/1980 | Komeya et al. |
| 4,234,344 A | 11/1980 | Tinsley et al. |
| 4,235,753 A | 11/1980 | Brown et al. |
| 4,235,836 A | 11/1980 | Wassell et al. |
| 4,240,840 A | 12/1980 | Downing et al. |
| 4,243,421 A | 1/1981 | Kume et al. |
| 4,250,134 A | 2/1981 | Minnick |
| 4,252,193 A | 2/1981 | Powers et al. |
| 4,256,504 A | 3/1981 | Dunstan, Jr. |
| 4,256,584 A | 3/1981 | Lord et al. |
| 4,258,090 A | 3/1981 | Moraru |
| 4,261,286 A | 4/1981 | Kupfer |
| 4,265,674 A | 5/1981 | Debus et al. |
| 4,268,316 A | 5/1981 | Wills, Jr. |
| 4,268,317 A | 5/1981 | Rayl |
| 4,274,913 A | 6/1981 | Kikuiri et al. |
| 4,292,206 A | 9/1981 | Barnes, Jr. et al. |
| 4,298,413 A | 11/1981 | Teare |
| 4,303,732 A | 12/1981 | Torobin |
| 4,304,604 A | 12/1981 | Daerr et al. |
| 4,305,758 A | 12/1981 | Powers et al. |
| 4,306,911 A | 12/1981 | Gordon et al. |
| 4,307,142 A | 12/1981 | Blitstein et al. |
| 4,328,145 A | 5/1982 | Bobrowski et al. |
| 4,330,634 A | 5/1982 | Rodaway |
| 4,332,618 A | 6/1982 | Ballard |
| 4,336,338 A | 6/1982 | Downs et al. |
| 4,339,289 A | 7/1982 | Lankard |
| 4,340,407 A | 7/1982 | Anderson et al. |
| 4,344,804 A | 8/1982 | Bijen et al. |
| 4,347,155 A | 8/1982 | Jenkins |
| 4,362,566 A | 12/1982 | Hinterwaldner |
| 4,363,878 A | 12/1982 | Yamamoto et al. |
| 4,370,166 A | 1/1983 | Powers et al. |
| 4,373,955 A | 2/1983 | Bouchard et al. |
| 4,374,672 A | 2/1983 | Funston et al. |
| 4,379,729 A | 4/1983 | Cross |
| 4,383,960 A | 5/1983 | Delcoigne et al. |
| 4,388,257 A | 6/1983 | Oguri et al. |
| 4,394,175 A | 7/1983 | Cheriton et al. |
| 4,394,346 A | 7/1983 | Morooka |
| 4,403,006 A | 9/1983 | Bruce et al. |
| 4,406,703 A | 9/1983 | Guthrie et al. |
| 4,411,723 A | 10/1983 | Takeuchi |
| 4,411,847 A | 10/1983 | Netting et al. |
| 4,428,775 A | 1/1984 | Johnson et al. |
| 4,430,108 A | 2/1984 | Hojaji |

(56) References Cited

U.S. PATENT DOCUMENTS

| | | |
|---|---|---|
| 4,441,944 A | 4/1984 | Massey |
| 4,448,599 A | 5/1984 | MacKenzie et al. |
| 4,450,022 A | 5/1984 | Galer |
| 4,457,785 A | 7/1984 | Hsu et al. |
| 4,462,835 A | 7/1984 | Car |
| 4,475,936 A | 10/1984 | Aston et al. |
| 4,478,736 A | 10/1984 | Raba et al. |
| 4,487,620 A | 12/1984 | Neusy et al. |
| 4,495,301 A | 1/1985 | Suter |
| 4,497,688 A | 2/1985 | Schaefer |
| 4,501,830 A | 2/1985 | Miller et al. |
| 4,504,320 A | 3/1985 | Rizer et al. |
| 4,504,335 A | 3/1985 | Galer |
| 4,507,154 A | 3/1985 | Burge et al. |
| 4,510,020 A | 4/1985 | Green et al. |
| 4,512,736 A | 4/1985 | Wader et al. |
| 4,517,375 A | 5/1985 | Schmidt et al. |
| 4,519,777 A | 5/1985 | Akhtyamov et al. |
| 4,538,530 A | 9/1985 | Whitman |
| 4,540,629 A | 9/1985 | Sands et al. |
| 4,548,676 A | 10/1985 | Johnstone et al. |
| 4,574,012 A | 3/1986 | Oguri et al. |
| 4,595,662 A | 6/1986 | Mochida et al. |
| 4,602,962 A | 7/1986 | Fehlmann |
| 4,621,024 A | 11/1986 | Wright |
| 4,623,390 A | 11/1986 | Delmonico |
| 4,624,798 A | 11/1986 | Gindrup et al. |
| 4,629,413 A | 12/1986 | Michelson et al. |
| 4,637,860 A | 1/1987 | Harper et al. |
| 4,637,990 A | 1/1987 | Torobin et al. |
| 4,643,753 A | 2/1987 | Braun |
| 4,643,920 A | 2/1987 | McEntee et al. |
| 4,647,505 A | 3/1987 | Blackie et al. |
| 4,647,509 A | 3/1987 | Wallace et al. |
| 4,647,589 A | 3/1987 | Valone |
| 4,652,433 A | 3/1987 | Ashworth et al. |
| 4,652,535 A | 3/1987 | Mackenzie et al. |
| 4,655,979 A | 4/1987 | Nakano et al. |
| 4,657,810 A | 4/1987 | Douden |
| 4,659,386 A | 4/1987 | Nagai et al. |
| 4,659,679 A | 4/1987 | Falk |
| 4,661,137 A | 4/1987 | Garnier et al. |
| 4,670,079 A | 6/1987 | Thompson |
| 4,677,022 A | 6/1987 | Dejaiffe |
| 4,680,059 A | 7/1987 | Cook et al. |
| 4,687,752 A | 8/1987 | Peters |
| 4,689,084 A | 8/1987 | Ambroise et al. |
| 4,721,160 A | 1/1988 | Parcevaux et al. |
| 4,738,723 A | 4/1988 | Frizzell et al. |
| 4,746,364 A | 5/1988 | Kawai et al. |
| 4,749,398 A | 6/1988 | Braun |
| 4,751,202 A | 6/1988 | Toussaint et al. |
| 4,751,203 A | 6/1988 | Toussaint et al. |
| 4,752,061 A | 6/1988 | Dalton et al. |
| 4,759,802 A | 7/1988 | Ochi et al. |
| 4,766,113 A | 8/1988 | West et al. |
| 4,767,491 A | 8/1988 | Vittone et al. |
| 4,767,726 A | 8/1988 | Marshall |
| 4,769,189 A | 9/1988 | Douden |
| 4,770,831 A | 9/1988 | Walker et al. |
| 4,772,328 A | 9/1988 | Pfeifer |
| 4,775,505 A | 10/1988 | Kuroda et al. |
| 4,780,141 A | 10/1988 | Double et al. |
| 4,806,203 A | 2/1989 | Elton |
| 4,816,091 A | 3/1989 | Miller et al. |
| 4,818,289 A | 4/1989 | Mantymaki et al. |
| 4,818,290 A | 4/1989 | Tuovinen et al. |
| 4,818,595 A | 4/1989 | Ellis |
| 4,819,289 A | 4/1989 | Gibbs |
| 4,826,788 A | 5/1989 | Dennert et al. |
| 4,830,989 A | 5/1989 | Trivedi et al. |
| 4,837,069 A | 6/1989 | Bescup et al. |
| 4,840,672 A | 6/1989 | Baes |
| 4,840,688 A | 6/1989 | Vogt |
| 4,846,889 A | 7/1989 | Meyer |
| 4,867,931 A | 9/1989 | Cochran, Jr. |
| 4,871,495 A | 10/1989 | Helferich et al. |
| 4,882,302 A | 11/1989 | Horiuchi et al. |
| 4,888,057 A | 12/1989 | Nguyen et al. |
| 4,894,081 A | 1/1990 | Neusy et al. |
| 4,904,292 A | 2/1990 | Neusy et al. |
| 4,904,503 A | 2/1990 | Hilton et al. |
| 4,915,740 A | 4/1990 | Sakai et al. |
| 4,928,479 A | 5/1990 | Shekleton et al. |
| 4,933,013 A | 6/1990 | Sakai et al. |
| 4,933,031 A | 6/1990 | Blomberg et al. |
| 4,935,060 A | 6/1990 | Dingsoyr |
| 4,937,210 A | 6/1990 | Jones et al. |
| 4,938,958 A | 7/1990 | Niira et al. |
| 4,944,842 A | 7/1990 | Stromberg et al. |
| 4,946,505 A | 8/1990 | Jungk |
| 4,946,811 A | 8/1990 | Tuovinen et al. |
| 4,971,658 A | 11/1990 | Henrickson et al. |
| 4,981,666 A | 1/1991 | Yamada et al. |
| 4,981,740 A | 1/1991 | Larsen |
| 4,983,550 A | 1/1991 | Goetz et al. |
| 4,985,119 A | 1/1991 | Vinson et al. |
| 4,994,113 A | 2/1991 | Helmstetter |
| 5,002,696 A | 3/1991 | White |
| 5,017,232 A | 5/1991 | Miceli |
| 5,021,093 A | 6/1991 | Beshay |
| 5,022,897 A | 6/1991 | Balcar et al. |
| 5,030,287 A | 7/1991 | Magnani |
| 5,030,289 A | 7/1991 | Sattler et al. |
| 5,032,548 A | 7/1991 | Lowe |
| 5,035,920 A | 7/1991 | Smrt et al. |
| 5,047,086 A | 9/1991 | Hayakawa et al. |
| 5,049,196 A | 9/1991 | Ries |
| 5,063,260 A | 11/1991 | Chen et al. |
| 5,064,784 A | 11/1991 | Saito et al. |
| 5,069,702 A | 12/1991 | Block et al. |
| 5,073,197 A | 12/1991 | Majumdar et al. |
| 5,077,241 A | 12/1991 | Moh et al. |
| 5,102,596 A | 4/1992 | Lempfer et al. |
| 5,106,557 A | 4/1992 | Rirsch et al. |
| 5,108,510 A | 4/1992 | Burge et al. |
| 5,108,679 A | 4/1992 | Rirsch et al. |
| 5,112,405 A | 5/1992 | Sanchez |
| 5,114,617 A | 5/1992 | Smetana |
| 5,115,621 A | 5/1992 | Kobayashi |
| 5,117,770 A | 6/1992 | Hassinen |
| 5,118,225 A | 6/1992 | Koch et al. |
| 5,128,114 A | 7/1992 | Schwartz |
| 5,143,534 A | 9/1992 | Kilner et al. |
| 5,143,780 A | 9/1992 | Balassa |
| 5,154,596 A | 10/1992 | Schwartz et al. |
| 5,154,771 A | 10/1992 | Wada et al. |
| 5,164,003 A | 11/1992 | Bosco et al. |
| 5,167,710 A | 12/1992 | Leroux et al. |
| 5,169,558 A | 12/1992 | Smrt et al. |
| 5,174,821 A | 12/1992 | Matsuoka et al. |
| 5,176,732 A | 1/1993 | Block et al. |
| 5,190,737 A | 3/1993 | Weimer et al. |
| 5,191,456 A | 3/1993 | Sutherland et al. |
| 5,192,366 A | 3/1993 | Nishioka et al. |
| 5,194,334 A | 3/1993 | Uerdingen et al. |
| 5,210,989 A | 5/1993 | Jakel |
| 5,217,928 A | 6/1993 | Goetz et al. |
| 5,220,762 A | 6/1993 | Lehnert et al. |
| 5,223,090 A | 6/1993 | Klungness et al. |
| 5,229,437 A | 7/1993 | Knight |
| 5,234,754 A | 8/1993 | Bache |
| 5,236,773 A | 8/1993 | Sorathia et al. |
| 5,236,994 A | 8/1993 | Markusch et al. |
| 5,252,526 A | 10/1993 | Whittemore |
| 5,253,991 A | 10/1993 | Yokota et al. |
| 5,254,228 A | 10/1993 | Westhof et al. |
| 5,256,180 A | 10/1993 | Garnier et al. |
| 5,259,872 A | 11/1993 | Shinozaki et al. |
| 5,290,355 A | 3/1994 | Jakel |
| 5,292,690 A | 3/1994 | Kawachi et al. |
| 5,294,255 A | 3/1994 | Smetana et al. |
| 5,314,119 A | 5/1994 | Watt |
| 5,319,245 A | 6/1994 | Chen et al. |

(56) References Cited

U.S. PATENT DOCUMENTS

| | | |
|---|---|---|
| 5,323,581 A | 6/1994 | Jakel |
| 5,330,573 A | 7/1994 | Nakano et al. |
| 5,338,357 A | 8/1994 | Takai et al. |
| 5,342,485 A | 8/1994 | Armbrust, Jr. |
| 5,346,012 A | 9/1994 | Heathman et al. |
| 5,346,541 A | 9/1994 | Goldman et al. |
| 5,349,118 A | 9/1994 | Davidovits |
| 5,352,288 A | 10/1994 | Mallow |
| 5,352,290 A | 10/1994 | Takeshita et al. |
| 5,358,676 A | 10/1994 | Jennings et al. |
| 5,366,637 A | 11/1994 | Turunc |
| 5,372,678 A | 12/1994 | Sagstetter et al. |
| 5,383,521 A | 1/1995 | Onan et al. |
| 5,383,967 A | 1/1995 | Chase |
| 5,384,345 A | 1/1995 | Naton |
| 5,385,764 A | 1/1995 | Andersen et al. |
| 5,387,282 A | 2/1995 | Jakel |
| 5,387,283 A | 2/1995 | Kirkpatrick et al. |
| 5,387,626 A | 2/1995 | Bohme-Kovac et al. |
| 5,391,245 A | 2/1995 | Turner |
| 5,403,392 A | 4/1995 | Craig |
| 5,403,394 A | 4/1995 | Burgand |
| 5,405,498 A | 4/1995 | Pease |
| 5,407,983 A | 4/1995 | Naton |
| 5,415,734 A | 5/1995 | Backlund et al. |
| 5,421,867 A | 6/1995 | Yeager et al. |
| 5,429,717 A | 7/1995 | Bokstrom et al. |
| 5,432,212 A | 7/1995 | Honda et al. |
| 5,432,215 A | 7/1995 | Girg et al. |
| 5,439,518 A | 8/1995 | Francis et al. |
| 5,443,603 A | 8/1995 | Kirkendall |
| 5,453,123 A | 9/1995 | Burge et al. |
| 5,453,310 A | 9/1995 | Andersen et al. |
| 5,458,973 A | 10/1995 | Jeffs |
| 5,465,547 A | 11/1995 | Jakel |
| 5,470,383 A | 11/1995 | Schermann et al. |
| 5,472,486 A | 12/1995 | Dragner et al. |
| 5,482,550 A | 1/1996 | Strait |
| 5,482,551 A | 1/1996 | Morris et al. |
| 5,484,480 A | 1/1996 | Styron |
| 5,490,889 A | 2/1996 | Kirkpatrick et al. |
| 5,508,072 A | 4/1996 | Andersen et al. |
| 5,520,779 A | 5/1996 | Bold |
| 5,534,348 A | 7/1996 | Miller et al. |
| 5,536,310 A | 7/1996 | Brook et al. |
| 5,547,505 A | 8/1996 | Nakatsu et al. |
| 5,549,859 A | 8/1996 | Andersen et al. |
| 5,556,458 A | 9/1996 | Brook et al. |
| 5,558,710 A | 9/1996 | Baig |
| 5,558,822 A | 9/1996 | Gitman et al. |
| 5,559,170 A | 9/1996 | Castle |
| 5,562,832 A | 10/1996 | McOnie et al. |
| 5,577,024 A | 11/1996 | Malkamaki et al. |
| 5,580,378 A | 12/1996 | Shulman |
| 5,580,508 A | 12/1996 | Kobayashi et al. |
| 5,580,907 A | 12/1996 | Savin |
| 5,583,079 A | 12/1996 | Golitz et al. |
| 5,591,684 A | 1/1997 | Kawachi |
| RE35,460 E | 2/1997 | Klungness et al. |
| 5,601,789 A | 2/1997 | Ruhl et al. |
| 5,603,758 A | 2/1997 | Schreifels, Jr. et al. |
| 5,609,833 A | 3/1997 | Ruhl et al. |
| 5,611,833 A | 3/1997 | Brahmbhatt et al. |
| 5,611,883 A | 3/1997 | Tompkins et al. |
| 5,618,173 A | 4/1997 | Ruhl et al. |
| 5,631,097 A | 5/1997 | Anderson et al. |
| 5,641,584 A | 6/1997 | Anderson et al. |
| 5,643,359 A | 7/1997 | Souroushian et al. |
| 5,644,880 A | 7/1997 | Lehnert et al. |
| 5,648,144 A | 7/1997 | Maurer et al. |
| 5,655,853 A | 8/1997 | Wormser |
| 5,658,624 A | 8/1997 | Anderson et al. |
| 5,658,656 A | 8/1997 | Whitney et al. |
| 5,676,536 A | 10/1997 | Ruhl et al. |
| 5,676,563 A | 10/1997 | Kondo et al. |
| 5,681,384 A | 10/1997 | Liskowitz et al. |
| 5,693,137 A | 12/1997 | Styron |
| 5,705,542 A | 1/1998 | Roffael et al. |
| 5,709,743 A | 1/1998 | Leture et al. |
| 5,718,758 A | 2/1998 | Breslauer |
| 5,718,759 A | 2/1998 | Stav et al. |
| 5,725,652 A | 3/1998 | Shulman |
| 5,728,458 A | 3/1998 | Sweeney |
| 5,736,602 A | 4/1998 | Crocker et al. |
| 5,743,393 A | 4/1998 | Webb et al. |
| 5,777,024 A | 7/1998 | Killilea |
| 5,785,419 A | 7/1998 | McKelvey |
| 5,786,282 A | 7/1998 | Carter et al. |
| 5,795,515 A | 8/1998 | Fischer |
| 5,804,003 A | 9/1998 | Nishizawa |
| 5,817,230 A | 10/1998 | Groppo et al. |
| 5,820,668 A | 10/1998 | Comrie |
| 5,849,055 A | 12/1998 | Arai et al. |
| 5,853,475 A | 12/1998 | Liskowitz et al. |
| 5,858,083 A | 1/1999 | Stav et al. |
| 5,863,477 A | 1/1999 | Kawai |
| 5,866,057 A | 2/1999 | Roffael et al. |
| 5,871,824 A | 2/1999 | Bates |
| 5,876,561 A | 3/1999 | Tsai |
| 5,883,029 A | 3/1999 | Castle |
| 5,888,322 A | 3/1999 | Holland |
| 5,891,374 A | 4/1999 | Shah et al. |
| 5,895,768 A | 4/1999 | Speit |
| 5,897,701 A | 4/1999 | Souroushian et al. |
| 5,899,256 A | 5/1999 | Rohatgi |
| 5,900,053 A | 5/1999 | Brothers et al. |
| 5,925,449 A | 7/1999 | Davidovits |
| 5,932,347 A | 8/1999 | Rapp et al. |
| 5,935,699 A | 8/1999 | Barber |
| 5,945,044 A | 8/1999 | Kawai et al. |
| 5,967,211 A | 10/1999 | Lucas et al. |
| 5,968,257 A | 10/1999 | Ahrens |
| 5,989,335 A | 11/1999 | Souroushian et al. |
| 5,997,630 A | 12/1999 | Angelskar et al. |
| 5,997,632 A | 12/1999 | Styron |
| 6,008,275 A | 12/1999 | Moreau et al. |
| 6,027,330 A | 2/2000 | Lifshits |
| 6,030,447 A | 2/2000 | Naji et al. |
| 6,034,155 A | 3/2000 | Espeland et al. |
| 6,045,057 A | 4/2000 | Moor et al. |
| 6,048,593 A | 4/2000 | Espeland et al. |
| 6,077,327 A | 6/2000 | Hamayoshi et al. |
| 6,086,998 A | 7/2000 | Wihsmann |
| 6,105,888 A | 8/2000 | Goehner et al. |
| 6,138,430 A | 10/2000 | Van Acoleyen et al. |
| 6,139,620 A | 10/2000 | Suzuki et al. |
| 6,143,069 A | 11/2000 | Brothers et al. |
| 6,171,651 B1 | 1/2001 | Brown |
| 6,204,214 B1 | 3/2001 | Singh et al. |
| 6,207,077 B1 | 3/2001 | Burnell-Jones |
| 6,228,215 B1 | 5/2001 | Hoffman, Jr. |
| 6,245,196 B1 | 6/2001 | Martin et al. |
| 6,254,845 B1 | 7/2001 | Ohashi et al. |
| 6,254,981 B1 | 7/2001 | Castle |
| 6,258,456 B1 | 7/2001 | Meyer |
| 6,277,189 B1 | 8/2001 | Chugh |
| 6,290,769 B1 | 9/2001 | Carkner |
| 6,325,853 B1 | 12/2001 | Hogan et al. |
| 6,332,921 B1 | 12/2001 | Brothers et al. |
| 6,344,654 B1 | 2/2002 | Lesko |
| 6,346,146 B1 | 2/2002 | Duselis et al. |
| 6,346,165 B1 | 2/2002 | Markessini et al. |
| 6,352,952 B1 | 3/2002 | Jardine et al. |
| 6,360,563 B1 | 3/2002 | Gerhardt et al. |
| 6,367,288 B1 | 4/2002 | Lindner et al. |
| 6,372,694 B1 | 4/2002 | Osinga et al. |
| 6,375,853 B1 | 4/2002 | Yoon |
| 6,387,175 B1 | 5/2002 | Lynn et al. |
| 6,387,302 B1 | 5/2002 | Konya et al. |
| 6,419,788 B1 | 7/2002 | Wingerson |
| 6,444,162 B1 | 9/2002 | Anshits et al. |
| 6,461,988 B2 | 10/2002 | Budd et al. |
| 6,475,275 B1 | 11/2002 | Nebesnak et al. |
| 6,482,258 B2 | 11/2002 | Styron |

(56) References Cited

U.S. PATENT DOCUMENTS

| | | |
|---|---|---|
| 6,485,561 B1 | 11/2002 | Dattel |
| 6,486,084 B2 | 11/2002 | Oda et al. |
| 6,488,762 B1 | 12/2002 | Shi |
| 6,506,248 B1 | 1/2003 | Duselis et al. |
| 6,506,819 B1 | 1/2003 | Shukla et al. |
| 6,512,132 B2 | 1/2003 | Isoda et al. |
| 6,528,151 B1 | 3/2003 | Shah et al. |
| 6,531,222 B1 | 3/2003 | Tanaka et al. |
| 6,533,848 B1 | 3/2003 | Robl et al. |
| 6,551,567 B2 | 4/2003 | Konya et al. |
| 6,562,743 B1 | 5/2003 | Cook et al. |
| 6,572,697 B2 | 6/2003 | Gleeson et al. |
| 6,572,698 B1 | 6/2003 | Ko |
| 6,582,819 B2 | 6/2003 | McDaniel et al. |
| 6,605,148 B2 | 8/2003 | Shirakawa et al. |
| 6,620,487 B1 | 9/2003 | Tonyan et al. |
| 6,626,991 B1 | 9/2003 | Drochon et al. |
| 6,630,417 B2 | 10/2003 | Kawai et al. |
| 6,641,658 B1 | 11/2003 | Dubey |
| 6,645,289 B2 | 11/2003 | Sobolev et al. |
| 6,648,961 B2 | 11/2003 | Brothers et al. |
| 6,656,265 B1 | 12/2003 | Garnier et al. |
| 6,660,077 B2 | 12/2003 | De Buen-Unna et al. |
| 6,660,078 B2 | 12/2003 | Brothers et al. |
| 6,676,744 B2 | 1/2004 | Merkley et al. |
| 6,676,745 B2 | 1/2004 | Merkley et al. |
| 6,682,595 B1 | 1/2004 | Barbour |
| 6,689,286 B2 | 2/2004 | Wilde et al. |
| 6,692,564 B2 | 2/2004 | Hofmann |
| 6,692,570 B2 | 2/2004 | Cottier et al. |
| 6,719,878 B1 | 4/2004 | Svedman |
| 6,749,897 B2 | 6/2004 | Naji et al. |
| 6,770,576 B2 | 8/2004 | Cook et al. |
| 6,777,103 B2 | 8/2004 | Merkley et al. |
| 6,809,131 B2 | 10/2004 | Li et al. |
| 6,811,603 B2 | 11/2004 | Brothers et al. |
| 6,814,798 B2 | 11/2004 | Vijn et al. |
| 6,824,605 B2 | 11/2004 | De Buen Unna et al. |
| 6,824,715 B2 | 11/2004 | Cottier et al. |
| 6,832,652 B1 | 12/2004 | Dillenbeck et al. |
| 6,837,452 B2 | 1/2005 | Dezutter et al. |
| 6,872,246 B2 | 3/2005 | Merkley et al. |
| 6,875,503 B1 | 4/2005 | Famy et al. |
| 6,893,751 B2 | 5/2005 | Naji et al. |
| 6,902,002 B1 | 6/2005 | Chatterji et al. |
| 6,933,038 B2 | 8/2005 | Nanko et al. |
| 6,942,726 B2 | 9/2005 | Cook et al. |
| 6,969,422 B2 | 11/2005 | Mazany et al. |
| 7,028,436 B2 | 4/2006 | Bezubic, Jr. |
| 7,081,184 B2 | 7/2006 | Wester et al. |
| 7,112,549 B2 | 9/2006 | Yoshitomi et al. |
| 7,128,965 B2 | 10/2006 | Famy et al. |
| 7,147,055 B2 | 12/2006 | Brothers et al. |
| 7,155,866 B2 | 1/2007 | Bezubic, Jr. et al. |
| 7,226,525 B2 | 6/2007 | Vrbanac et al. |
| 7,338,702 B2 | 3/2008 | Swales et al. |
| 7,344,593 B2 | 3/2008 | Luo et al. |
| 7,396,402 B2 | 7/2008 | Naji et al. |
| 7,419,544 B2 | 9/2008 | Naji et al. |
| 7,455,727 B2 | 11/2008 | Trevethick |
| 7,658,794 B2 | 2/2010 | Gleeson et al. |
| 7,727,329 B2 | 6/2010 | Gleeson et al. |
| 8,182,606 B2 | 5/2012 | Gleeson et al. |
| 2001/0043996 A1 | 11/2001 | Yamada et al. |
| 2002/0004111 A1 | 1/2002 | Matsubara et al. |
| 2002/0007926 A1 | 1/2002 | Jewell et al. |
| 2002/0007927 A1 | 1/2002 | Vahatalo et al. |
| 2002/0025436 A1 | 2/2002 | Meyer |
| 2002/0043996 A1 | 4/2002 | Iwamoto |
| 2002/0051892 A1 | 5/2002 | Laks et al. |
| 2002/0059886 A1 | 5/2002 | Merkley et al. |
| 2002/0069791 A1 | 6/2002 | Merkley et al. |
| 2002/0088584 A1 | 7/2002 | Merkley et al. |
| 2002/0112827 A1 | 8/2002 | Merkley et al. |
| 2002/0121229 A1 | 9/2002 | Jardine et al. |
| 2002/0170466 A1 | 11/2002 | Naji et al. |
| 2002/0170467 A1 | 11/2002 | Naji et al. |
| 2002/0170468 A1 | 11/2002 | Luo et al. |
| 2002/0175126 A1 | 11/2002 | Naji et al. |
| 2002/0179219 A1 | 12/2002 | Naji et al. |
| 2002/0189499 A1 | 12/2002 | Naji et al. |
| 2002/0189500 A1 | 12/2002 | Naji et al. |
| 2002/0192510 A1 | 12/2002 | Naji et al. |
| 2003/0000424 A1 | 1/2003 | Naji et al. |
| 2003/0100434 A1 | 5/2003 | Yoshitomi et al. |
| 2003/0164119 A1 | 9/2003 | Naji et al. |
| 2003/0165624 A1 | 9/2003 | Naji et al. |
| 2003/0177955 A1 | 9/2003 | Vijn et al. |
| 2003/0205172 A1 | 11/2003 | Gleeson et al. |
| 2003/0213568 A1 | 11/2003 | Wester et al. |
| 2003/0213569 A1 | 11/2003 | Wester et al. |
| 2003/0213570 A1 | 11/2003 | Vrbanac et al. |
| 2003/0213572 A1 | 11/2003 | Vrbanac et al. |
| 2004/0043217 A1 | 3/2004 | Dezutter et al. |
| 2004/0043686 A1 | 3/2004 | Batdorf |
| 2004/0079260 A1 | 4/2004 | Datta et al. |
| 2004/0080063 A1 | 4/2004 | Datta et al. |
| 2004/0081827 A1 | 4/2004 | Datta et al. |
| 2004/0083677 A1 | 5/2004 | Bezubic, Jr. |
| 2004/0099982 A1 | 5/2004 | Sirola et al. |
| 2004/0132843 A1 | 7/2004 | Baumgart et al. |
| 2004/0145078 A1 | 7/2004 | Merkley et al. |
| 2004/0168615 A1 | 9/2004 | Luo et al. |
| 2004/0211342 A1 | 10/2004 | Sprouts et al. |
| 2004/0262801 A1 | 12/2004 | Hojaji et al. |
| 2005/0005821 A1 | 1/2005 | Colombet et al. |
| 2005/0011412 A1 | 1/2005 | Vijn et al. |
| 2005/0016423 A1 | 1/2005 | Merkley et al. |
| 2005/0045067 A1 | 3/2005 | Naji et al. |
| 2005/0126430 A1 | 6/2005 | Lightner, Jr. et al. |
| 2005/0208287 A1 | 9/2005 | Naji et al. |
| 2005/0235883 A1 | 10/2005 | Merkley et al. |
| 2006/0147681 A1 | 7/2006 | Dubey |
| 2006/0168906 A1 | 8/2006 | Tonyan et al. |
| 2007/0022913 A1 | 2/2007 | Wang et al. |
| 2007/0077436 A1 | 4/2007 | Naji et al. |
| 2007/0110981 A1 | 5/2007 | Killilea et al. |
| 2007/0186822 A1 | 8/2007 | Utagaki et al. |
| 2007/0246864 A1 | 10/2007 | Utagaki et al. |
| 2007/0261607 A1 | 11/2007 | Utagaki et al. |
| 2008/0072795 A1 | 3/2008 | Utagaki et al. |
| 2008/0072796 A1 | 3/2008 | Utagaki et al. |
| 2008/0095692 A1 | 4/2008 | Pham |
| 2008/0096018 A1 | 4/2008 | Zhang et al. |
| 2008/0157428 A1 | 7/2008 | Utagaki et al. |
| 2008/0176057 A1 | 7/2008 | Ukai |
| 2008/0178771 A1 | 7/2008 | Utagaki et al. |
| 2008/0190062 A1 | 8/2008 | Engbrecht et al. |
| 2008/0191165 A1 | 8/2008 | Nakagawa |
| 2008/0199677 A1 | 8/2008 | Ukai |
| 2008/0203365 A1 | 8/2008 | Gleeson et al. |
| 2008/0311346 A1 | 12/2008 | Ohno |
| 2009/0025897 A1 | 1/2009 | Aizawa |

FOREIGN PATENT DOCUMENTS

| | | |
|---|---|---|
| AR | 227376 | 10/1982 |
| AR | 228671 | 3/1983 |
| AR | 291988 | 1/1984 |
| AR | 151553 | 10/1986 |
| AR | 240667 | 8/1990 |
| AR | 250022 | 7/1996 |
| AR | 14702 | 3/1999 |
| AR | 10221 | 6/2000 |
| AR | 12644 | 11/2000 |
| AR | 14046 | 3/2006 |
| AR | 15457 | 10/2006 |
| AT | 391131 | 8/1990 |
| AU | 515151 | 3/1981 |
| AU | 44948/85 | 1/1986 |
| AU | 552930 | 6/1986 |
| AU | 55929/86 | 10/1986 |
| AU | 572111 | 5/1988 |
| AU | 606344 | 1/1989 |

(56) References Cited

FOREIGN PATENT DOCUMENTS

| | | |
|---|---|---|
| AU | 13067/92 | 9/1992 |
| AU | 659400 | 5/1995 |
| AU | 697348 | 3/1997 |
| AU | 734095 | 3/1999 |
| AU | 2002240552 | 9/2002 |
| CA | 1040859 | 10/1978 |
| CA | 1177205 | 11/1984 |
| CA | 2242749 | 2/1999 |
| CL | 32972 | 2/1980 |
| CL | 2346-01 | 9/2001 |
| CL | 2347-01 | 9/2001 |
| CL | 2352-01 | 9/2001 |
| CL | 2353-01 | 9/2001 |
| CL | 461-02 | 3/2002 |
| CN | 1032332 | 4/1989 |
| CN | 1081168 | 1/1994 |
| CN | 1087885 | 6/1994 |
| CN | 1099089 | 2/1995 |
| CN | 1160070 | 9/1997 |
| CN | 1178202 | 4/1998 |
| CN | 1199116 | 11/1998 |
| CN | 1224701 | 8/1999 |
| CN | 1251358 | 4/2000 |
| CN | 1061328 | 1/2001 |
| CN | 1500038 | 5/2004 |
| CS | 222361 | 8/1985 |
| CZ | 283459 | 4/1998 |
| DE | 2344773 | 3/1975 |
| DE | 143936 | 9/1980 |
| DE | 3037220 | 4/1982 |
| DE | 3213521 | 6/1983 |
| DE | 3308917 | 9/1984 |
| DE | 3314796 | 10/1984 |
| DE | 3324671 | 1/1985 |
| DE | 3601736 | 1/1986 |
| DE | 3711549 | 10/1987 |
| DE | 3743467 | 7/1989 |
| DE | 3908172 | 9/1990 |
| DE | 4229572 | 3/1993 |
| DE | 4316666 | 12/1994 |
| DE | 19607081 | 8/1997 |
| DE | 19654836 | 6/1998 |
| DE | 19858342 | 8/2000 |
| DE | 19962137 | 6/2001 |
| EP | 7585 | 7/1979 |
| EP | 23162 | 1/1981 |
| EP | 33133 | 8/1981 |
| EP | 36275 | 9/1981 |
| EP | 49365 | 4/1982 |
| EP | 69095 | 6/1982 |
| EP | 56263 | 7/1982 |
| EP | 102092 | 3/1984 |
| EP | 159046 | 10/1985 |
| EP | 159173 | 10/1985 |
| EP | 287962 | 4/1987 |
| EP | 222339 | 5/1987 |
| EP | 242872 | 10/1987 |
| EP | 247817 | 12/1987 |
| EP | 297186 | 1/1989 |
| EP | 305209 | 3/1989 |
| EP | 314242 | 5/1989 |
| EP | 327351 | 8/1989 |
| EP | 328431 | 8/1989 |
| EP | 376334 | 7/1990 |
| EP | 263723 | 2/1991 |
| EP | 430995 | 6/1991 |
| EP | 449360 | 10/1991 |
| EP | 484283 | 6/1992 |
| EP | 593779 | 4/1994 |
| EP | 601594 | 6/1994 |
| EP | 619227 | 10/1994 |
| EP | 619277 | 10/1994 |
| EP | 359362 | 4/1995 |
| EP | 147429 | 7/1995 |
| EP | 717675 | 6/1996 |
| EP | 725044 | 8/1996 |
| EP | 803484 | 10/1997 |
| EP | 846666 | 6/1998 |
| EP | 846668 | 6/1998 |
| EP | 678488 | 9/1998 |
| EP | 891954 | 1/1999 |
| EP | 931778 | 7/1999 |
| EP | 999232 | 5/2000 |
| EP | 801037 | 8/2000 |
| EP | 1052262 | 11/2000 |
| EP | 1088800 | 4/2001 |
| EP | 1106236 | 6/2001 |
| EP | 1155794 | 11/2001 |
| EP | 1156021 | 11/2001 |
| EP | 1160212 | 12/2001 |
| EP | 1172341 | 1/2002 |
| EP | 1246782 | 10/2002 |
| EP | 1346964 | 9/2003 |
| EP | 1556313 | 7/2005 |
| EP | 1334076 | 8/2006 |
| EP | 1801278 | 6/2007 |
| EP | 1891984 | 2/2008 |
| EP | 1985671 | 10/2008 |
| ES | 2033987 | 4/1993 |
| FR | 895184 | 3/1944 |
| FR | 1557348 | 2/1969 |
| FR | 2512440 | 3/1983 |
| FR | 2611432 | 9/1988 |
| FR | 2671072 | 7/1992 |
| GB | 22139 | 0/1905 |
| GB | 413294 | 7/1934 |
| GB | 442098 | 2/1936 |
| GB | 449384 | 6/1936 |
| GB | 682432 | 11/1952 |
| GB | 731597 | 6/1955 |
| GB | 740145 | 11/1955 |
| GB | 743866 | 1/1956 |
| GB | 744070 | 2/1956 |
| GB | 752345 | 7/1956 |
| GB | 896910 | 5/1962 |
| GB | 1003850 | 8/1963 |
| GB | 1062410 | 3/1967 |
| GB | 1066768 | 4/1967 |
| GB | 1258288 | 12/1971 |
| GB | 1265471 | 3/1972 |
| GB | 1448320 | 9/1976 |
| GB | 1490711 | 11/1977 |
| GB | 1493202 | 11/1977 |
| GB | 1493203 | 11/1977 |
| GB | 1514239 | 6/1978 |
| GB | 1515521 | 6/1978 |
| GB | 1532922 | 11/1978 |
| GB | 1536663 | 12/1978 |
| GB | 2019386 | 10/1979 |
| GB | 2025928 | 1/1980 |
| GB | 2041384 | 9/1980 |
| GB | 1584175 | 2/1981 |
| GB | 1604910 | 12/1981 |
| GB | 2106527 | 4/1983 |
| GB | 2137977 | 10/1984 |
| GB | 2230772 | 10/1990 |
| GB | 2248834 | 4/1992 |
| GB | 2256867 | 12/1992 |
| GB | 2276875 | 10/1995 |
| GB | 2307425 | 5/1997 |
| GB | 2330138 | 4/1999 |
| GB | 2433497 | 6/2007 |
| HU | 164419 | 2/1974 |
| HU | 173947 | 9/1979 |
| HU | 180773 | 4/1983 |
| HU | 31027 | 4/1984 |
| HU | 200511 | 9/1986 |
| HU | 895285 | 1/1990 |
| HU | 209836 | 7/1990 |
| HU | 9602843 | 12/1996 |
| HU | 1904 | 11/2000 |
| IT | 1311962 | 3/2002 |
| JE | 9077543 | 3/1997 |
| JP | 2107 / 1968 | 1/1943 |

(56) References Cited

FOREIGN PATENT DOCUMENTS

| | | |
|---|---|---|
| JP | 54-25927 | 2/1954 |
| JP | 75095319 | 7/1975 |
| JP | 55085756 | 6/1980 |
| JP | 55095654 | 7/1980 |
| JP | 55130847 | 10/1980 |
| JP | 56014466 | 2/1981 |
| JP | 57017452 | 1/1982 |
| JP | 57156361 | 9/1982 |
| JP | 57183344 | 11/1982 |
| JP | 58000351 | 1/1983 |
| JP | 58055034 | 4/1983 |
| JP | 58110443 | 7/1983 |
| JP | 58149939 | 9/1983 |
| JP | 59045953 | 3/1984 |
| JP | 59107985 | 6/1984 |
| JP | 203747 / 84 | 11/1984 |
| JP | 9-217659 | 12/1984 |
| JP | 60135211 | 7/1985 |
| JP | 60161381 | 8/1985 |
| JP | 60191074 | 9/1985 |
| JP | 61019900 | 1/1986 |
| JP | 61141656 | 6/1986 |
| JP | 88052740 | 6/1986 |
| JP | 61178462 | 8/1986 |
| JP | 62036055 | 2/1987 |
| JP | 62036056 | 2/1987 |
| JP | 62207751 | 9/1987 |
| JP | 62235274 | 10/1987 |
| JP | 63008248 | 1/1988 |
| JP | 6330381 | 2/1988 |
| JP | 63107849 | 5/1988 |
| JP | 63248751 | 10/1988 |
| JP | 63257631 | 10/1988 |
| JP | 10-29843 | 1/1989 |
| JP | 64-29843 | 1/1989 |
| JP | 64-37478 | 2/1989 |
| JP | 1141849 | 6/1989 |
| JP | 92052746 | 4/1990 |
| JP | 92054171 | 4/1990 |
| JP | 192478 / 1990 | 7/1990 |
| JP | 2192447 | 7/1990 |
| JP | 2283646 | 11/1990 |
| JP | 2289456 | 11/1990 |
| JP | 3016978 | 1/1991 |
| JP | 3295843 | 12/1991 |
| JP | 4002642 | 1/1992 |
| JP | 4042875 | 2/1992 |
| JP | 4089340 | 3/1992 |
| JP | 4104945 | 4/1992 |
| JP | 4144949 | 5/1992 |
| JP | 4-182333 | 6/1992 |
| JP | 4182335 | 6/1992 |
| JP | 4114937 | 7/1992 |
| JP | 4193748 | 7/1992 |
| JP | 4260645 | 9/1992 |
| JP | 4292906 | 10/1992 |
| JP | 4295072 | 10/1992 |
| JP | 4300232 | 10/1992 |
| JP | 4342746 | 11/1992 |
| JP | 4349155 | 12/1992 |
| JP | 5154816 | 6/1993 |
| JP | 5-186261 | 7/1993 |
| JP | 5177625 | 7/1993 |
| JP | 5184246 | 7/1993 |
| JP | 246726 / 1993 | 9/1993 |
| JP | 5229859 | 9/1993 |
| JP | 6001648 | 1/1994 |
| JP | 6-24821 | 2/1994 |
| JP | 6127992 | 5/1994 |
| JP | 6144911 | 5/1994 |
| JP | 6144912 | 5/1994 |
| JP | 6256053 | 9/1994 |
| JP | 6258053 | 9/1994 |
| JP | 6271371 | 9/1994 |
| JP | 341093 / 94 | 12/1994 |
| JP | 7024299 | 1/1995 |
| JP | 7033502 | 2/1995 |
| JP | 7041592 | 2/1995 |
| JP | 07-109165 | 4/1995 |
| JP | 7165455 | 6/1995 |
| JP | 7187734 | 7/1995 |
| JP | 7196348 | 8/1995 |
| JP | 7291701 | 11/1995 |
| JP | 7291707 | 11/1995 |
| JP | 7292846 | 11/1995 |
| JP | 7315869 | 12/1995 |
| JP | 8012405 | 1/1996 |
| JP | 8012450 | 1/1996 |
| JP | 8040758 | 2/1996 |
| JP | 8067541 | 3/1996 |
| JP | 8073283 | 3/1996 |
| JP | 8119708 | 5/1996 |
| JP | 2508554 | 6/1996 |
| JP | 8169779 | 7/1996 |
| JP | 8217561 | 8/1996 |
| JP | 9020526 | 1/1997 |
| JP | 9052747 | 2/1997 |
| JP | 9067174 | 3/1997 |
| JP | 9086996 A | 3/1997 |
| JP | 9092895 | 4/1997 |
| JP | 9124327 | 5/1997 |
| JP | 9201561 | 8/1997 |
| JP | 59217659 | 8/1997 |
| JP | 9227200 | 9/1997 |
| JP | 9255383 | 9/1997 |
| JP | 9315843 A | 12/1997 |
| JP | 10036161 | 2/1998 |
| JP | 10095648 | 4/1998 |
| JP | 10095922 | 4/1998 |
| JP | 10-152356 | 6/1998 |
| JP | 10330146 | 12/1998 |
| JP | 11010631 | 1/1999 |
| JP | 11092202 | 4/1999 |
| JP | 11099512 | 4/1999 |
| JP | 11116299 | 4/1999 |
| JP | 11139859 | 5/1999 |
| JP | 335146 / 1990 | 12/1999 |
| JP | 2000119050 | 4/2000 |
| JP | 2000143307 | 5/2000 |
| JP | 2000160057 | 6/2000 |
| JP | 2000302498 | 10/2000 |
| JP | 2000302522 | 10/2000 |
| JP | 2001026485 | 1/2001 |
| JP | 2001163647 | 6/2001 |
| JP | 2001240439 | 9/2001 |
| JP | 2001240458 | 9/2001 |
| JP | 2001316157 | 11/2001 |
| JP | 2001316163 | 11/2001 |
| JP | 2002003248 | 1/2002 |
| JP | 2002053361 | 2/2002 |
| JP | 2002231865 | 8/2002 |
| JP | 55064 / 2003 | 2/2003 |
| JP | 2003073756 | 3/2003 |
| JP | 2003335560 | 11/2003 |
| JP | 2005034695 | 2/2005 |
| KR | 9508587 | 8/1995 |
| KR | 1019950008587 | 8/1995 |
| KR | 2000014685 | 3/2000 |
| KR | 2001053808 | 7/2001 |
| NO | 9901129 | 9/2000 |
| PL | 170678 | 11/1991 |
| PL | 154782 | 12/1991 |
| PL | 190627 | 12/1997 |
| PL | 190446 | 3/1998 |
| RU | 2039019 | 7/1995 |
| RU | 2161695 | 1/2001 |
| RU | 2167485 | 5/2001 |
| RU | 2168485 | 6/2001 |
| RU | 2243189 | 12/2004 |
| SU | 240472 | 3/1969 |
| SU | 411054 | 1/1974 |
| SU | 1571024 | 6/1990 |
| SU | 1650196 | 5/1991 |
| SU | 1668346 | 8/1991 |

(56) References Cited

FOREIGN PATENT DOCUMENTS

| | | |
|---|---|---|
| SU | 1724613 | 4/1992 |
| TW | 408089 | 10/2000 |
| WO | WO-8203386 | 10/1982 |
| WO | WO-8301947 | 6/1983 |
| WO | WO 84/04765 | 12/1984 |
| WO | WO 85/00361 | 1/1985 |
| WO | WO-8502394 | 6/1985 |
| WO | WO 86/00291 | 1/1986 |
| WO | WO-8700827 | 2/1987 |
| WO | WO-9002102 | 3/1990 |
| WO | WO 91/01409 | 2/1991 |
| WO | WO 92/00251 | 1/1992 |
| WO | WO 92/10440 | 6/1992 |
| WO | WO-9507177 | 3/1995 |
| WO | WO-9520066 | 7/1995 |
| WO | WO 96/07538 | 3/1996 |
| WO | WO 96/17996 | 6/1996 |
| WO | WO 96/40598 | 12/1996 |
| WO | WO 97/08111 | 3/1997 |
| WO | WO 97/21640 | 6/1997 |
| WO | WO 97/27152 | 7/1997 |
| WO | WO 97/31153 | 8/1997 |
| WO | WO 98/03284 | 1/1998 |
| WO | WO-9812149 | 3/1998 |
| WO | WO 9818855 | 5/1998 |
| WO | WO 98/27027 | 6/1998 |
| WO | WO 98/29353 | 7/1998 |
| WO | WO 99/08885 | 2/1999 |
| WO | WO 99/35330 | 7/1999 |
| WO | WO 00/21901 | 4/2000 |
| WO | WO 00/48960 | 8/2000 |
| WO | WO 00/71336 | 11/2000 |
| WO | WO 01/16048 | 3/2001 |
| WO | WO 01/30927 | 5/2001 |
| WO | WO 0151427 | 7/2001 |
| WO | WO 01/68547 | 9/2001 |
| WO | WO 01/72863 | 10/2001 |
| WO | WO 01/81666 | 11/2001 |
| WO | WO 02/12623 | 2/2002 |
| WO | WO 02/18486 | 3/2002 |
| WO | WO 02/28795 | 4/2002 |
| WO | WO 02/28796 | 4/2002 |
| WO | WO 02/33164 | 4/2002 |
| WO | WO 02/070145 | 9/2002 |
| WO | WO 02/070218 | 9/2002 |
| WO | WO 02/070247 | 9/2002 |
| WO | WO 02/070421 | 9/2002 |
| WO | WO 02/070425 | 9/2002 |
| WO | WO 02/072499 | 9/2002 |
| WO | WO-2004011391 | 2/2004 |
| WO | WO 2004/018090 | 3/2004 |
| WO | WO-2004033388 | 4/2004 |
| WO | WO 2004/063113 | 7/2004 |
| WO | WO 2004/101137 | 11/2004 |
| WO | WO-2006056644 | 6/2006 |
| WO | WO-2006091929 | 8/2006 |
| WO | WO-2006113379 | 10/2006 |
| WO | WO-2007005041 | 1/2007 |
| WO | WO-2007009935 | 1/2007 |
| WO | WO-2007067774 | 6/2007 |
| WO | WO-2008066746 | 6/2008 |
| WO | WO-2008100777 | 8/2008 |

OTHER PUBLICATIONS

Rozman et al., "Improvements of Fibreboard Properties through Fibre Activation with Silane," Intern. J. Polymeric Mater., vol. 32 (1996) pp. 247-257.

Zhou, Ming "The Trial of Antisepsis and Mothproof on Rural Timber Structure Architectures," China Wood Industry, Issue 2 of 1987, pp. 16-24.

Skaggs, C.B. et al "Applications of Rheological Modifiers and Superplasticizers in Cementitious System" American Concrete Institute SP, (1994), SP-148, 189-207.

Gehm, Harry W. "New and Basic Research Approaches to Liquid Effluent Treatment" Paper Trade Journal (1958), 142 (No. 16), 40-4, 46.

Benitez, et al. "Optimization Technique for Sewage Sludge Conditioning with Polymer and Skeleton Builders" Water Research (1994), 28(10), 2067-73.

Blankenburg et al. "Quality and Possible Use of Brown Coal Fly Ash of East Germany" Freiberger Forschungshefte C (1986), C413, 102-14.

Xu, L. et al. "Study on Particle Size Distribution and Chemical Activity of Mechanical Activated Fly Ash" Guisuanyan Tongbao (2003), 22(2), 73-76.

"Self-Leveling Elastic Waterproofing Coating," Shangai Building Materials, Issue 6, 2000, 5 pgs.

Sevcik, V., XP002389199, "Mixture for Refractory Purposes" Database EPODOC, European Patent Office, The Hague, NL; (Oct. 15, 1997); CZ283459.

Chemical Abstracts, vol. 103, No. 22, Abstract No. 182776h, CS222361 "Mixture for Autoclaved Lime-Silica Concrete." Dec. 2, 1985, p. 299.

Crennan et al. "Autoclaved Lime-Quartz Materials" Cement and Concrete Research, vol. 7, pp. 493-502, 1977.

Abo-El-Enein, et al. "Autoclaved Calcium Silicate Hydrates. I—Rate of Formation and Molar Composition," II Cemento Mar. 1990, pp. 147-160.

Isu et al. "Influence of Quartz Particle Size on the Chemical and Mechanical Properties of Autoclaved Aerated Concrete" Cement & Concrete Research, vol. 25, No. 2, pp. 243-248, 1995.

Arai et al. "Crystal Shape and Size Controls of Xonotlite" Gypsum and Lime, No. 248, pp. 17-25, 1994.

Aitken, et al. "Hydrothermal Reactions in Lime-Quartz Pastes" J. Appl. Chem., pp. 7-15, Jan. 10, 1960.

Assarsson, "Hydrothermal Reactions Between Calcium Hydroxide and Muscovite and Feldspar at 120-220.degree." J. Phys. Chem. 64 (1960) pp. 626-632.

Chan, et al. "Formation of 11 A Tobermorite from Mixtures of Lime and Collidal Silica with Quartz" Cem. Concr. Res., 8 (1978) 135-138.

Kondo "Kinetic Study on Hydrothermal Reaction Between Lime and Silica" Autoclaves Calcium Silicate Building Products, London, 1965, pp. 92-100 (1967).

Kondo, et al. "Kinetics and Mechanism of Hydrothermal reaction in Lime-Quartz-Water System" J. Ceram. Soc. Japan, 84 (1976) 573-578.

Celite Material Safety Data Sheet (MSDS)—revised date: Jul. 10, 1992.

Kennedy George C., Econ. Geol. 45 [7] 652 (1950).

Technical File by Louisiana-Pacific Samoa, Inc. sent to Redco on May 5, 1999. (4 pgs).

Declaration by a Representative of the company Weyerhaeuser (Bill Adams), and bills dated prior to Oct. 17, 1999.

Campbell, et al. "Wood Fibre-Reinforced Cement Composites" Journal of Materials Science, 15 (1980) pp. 1962-1970.

Coutts, "From Forest to Factory to Fabrication" in Fibre Reinforced Cement and Concrete, 1992 ed. R.N. Swamy, E & FN SPON, London, pp. 31-47.

Extract from Webster's Third New International Dictionary of the English Language unabridged, ed. Merriam-Webster Inc., Springfield, p. 1840 (1986).

Woods, "Keeping a Lid on It: Asbestos-Cement Building Materials" Aug. 2000 (12 pgs) internet article located at: www.cr.nps.gov/hps/tps/recentpast/asbestosarticle.htm.

Chapter 5 "Asbestos Cement Products" pp. 25-40 (book / date unknown).

Chemical Abstracts on STN "Plasticizing Effect of Aliphatic Amines on Cements" Babachev et al., Build Sci Inst. Sofia Bulgaria; Epitoanyag (1972) 24(11), 430-5.

Chemical Abstracts, vol. 94, No. 8, "Building Materials with Improved Black Mold Resistance" JP 8085756, Columbus, Ohio; Abstract No. 51915a; Feb. 23, 1981, (XP 000186251).

Hawley's Condensed Chemical Dictionary, Richard Lewis Sr., Twelfth Ed., 1993 Van Nostrand Reinhold, p. 435, definition of "dispersing agent."

(56) References Cited

OTHER PUBLICATIONS

Shapiro, et al. "Manufacture of Board Resistant to Biological Degradation" Bumazhnaya Promyshiennost 36(No. 7) (1961) (XP-002335287).
Finnish Forest Industries Federal "Mechanical Pulp Production" internet article located at http://english.forestindustries.fi/products/pulp/mechanical.html, dated Nov. 10, 2004 (2 pgs).
Ekman et al. "Studies on the Behavior of Extractives in Mechanical Pulp Suspensions" Nordic Pulp Paper Res. J. 2, No. 5: (abstract); Jun. 1990 (XP-002194276).
Ekman et al. "Studies on the Behavior of Extractives in Mechanical Pulp Suspensions" Nordic Pulp and Paper Research Journal No. 2 (1990), pp. 96-103.
Soroushian, "Development of Specialty Cellulose Fibers and Cementitious Matrices for Cellelose Fiber Reinforced Cement Composites" pp. 1-38 (undated).
Lin et al. "Improvements in the Durability of Cellulose Reinforced Cementitious Composites" Mechanisms of Chemical Degradation of Cement-Based Systems, Proceedings of the Materials Research Society's Symposium on Mechanisms of Chemical Degradation of Cement-Based Systems, Boston, Nov. 27-30, 1995 (1997).
Neithalath, et al. "Acoustic Performance and Damping Behavior of Cellulose-Cement Composites" Cement & Concrete Composites 25 (2003), pp. 1-12.
Mai et al. "Effects of Water and Bleaching on the Mechanical Properties of Cellulose Fiber Cements" Journal of Materials Science 18 (1983) pp. 2156-2162 (w/attached abstract).
Mai et al. "Slow Crack Growth in Bleached Cellulose Fibre Cements" Journal of Mat'ls Science Letters 3 (1984) pp. 127-130 (w/attached abstract).
Jubocid "Special Anti-Mildew Coatings" Technical Sheet Sep. 10, 2002 (4 pgs).
Thai MDF Board Co., Ltd "Beger Synotex Acrylic TM 100% Emulsion Paint" (2 pgs); 2003 internet article located at: http://www.thaimdf.com/paint.sub.--roofpaint.htm.
"Hardi-Plank and Surface Mold" internet article locate at: http://www.nefsi.org/wwwboard/messages/439.html; Jun. 13, 2003 (2 pgs).
Force 10 Caribbean "Custom Features" Engineered Building Systems (1999) 5 pgs.
Chemical Abstracts, vol. 117, No. 6, Abstract 54763d; "Aluminum hydroxide-containing cement compositions for extrusion" (JP 0489340), American Chemical Society, Columbus, OH Aug. 10, 1992, p. 390.
Chemical Abstracts, vol. 90, No. 16, American Chemical Society, Columbus, OH, Apr. 16, 1979, p. 303.
Chemical Abstracts, vol. 95, No. 16, American Chemical Society, Columbus, OH, Oct. 19, 1981, p. 288.
Chemical Abstracts, vol. 86, No. 18, American Chemical Society, Columbus, OH, May 2, 1977, p. 303.
Chemical Abstracts, vol. 95, No. 2, American Chemical Society, Columbus, OH, Jul. 13, 1981, p. 282.
Chemical Abstracts, vol. 98, No. 22, American Chemical Society, Columbus, OH, Nov. 22, 1983, p. 312.
"Celite Products" World Minerals Corporation, internet article located at: http://www.worldminerals.com/celite.html, 2006 (1 pg.).
"Vermiculite Properties" The Vermiculite Association, internet article located at: http://www.vermiculite.org/properties.htm, printed Aug. 6, 2007, (3 pgs.).
Webster's II New Riverside University Dictionary, definition of "hollow" (1984) p. 587.
"Silica Fume," Cement Association of Canada, internet article located at: http://www.cement.ca/cement.nsf/ep/07669ADF88663915852568A9005A770?opendocument, printed Aug. 6, 2007 (2 pgs).
"Muscovite Mica and Phlogopite Mica" Reade Advanced Materials, internet article located at: http://www.reade.com/Products/Minerals.sub.--and.sub.--Ores/mica.html, printed Aug. 6, 2007, (3 pgs).
Litigation documents corresponding to Civil Case No. SCVSS115246. No. 5:04-CV-00674-RT-SGL, No. 04-C-1621, No. 05-CV-44, and No. A2-04-152.
Pawlowski, et al. "Novel Raw Material for Producing Heat Insulating Materials" Silikattechnik (1982) 33(11), 339-40 (abstract page).
Kolay, et al: "Physical, Chemical, Mineralogical, and Thermal Properties of Cenospheres from an Ash Lagoon" Dec. 29, 2000, pp. 539-542.
"What are Cenospheres" internet article located at http://www.microspheres.co.za/contents.htm, printed Jul. 11, 2006, (5 pgs).
Gubka article "Composition and Morphology of Cenospheres" located at: http://www.atom.nw.ru/rie/projects/gubka/properties/cenospheres.shtml, printed Jul. 11, 2006, (2 pgs).
3M Material Safety Data Sheet, 3M.TM. Glass Bubbles, Types K and S, Apr. 10, 2006, pp. 1-7.
"Glass" Corning Glass Works—reprinted version of the Encyclopedia of chemical Technology (vol. 10) 2.sup.nd ed. (pp. 542-543), 1955.
"Do You Need to Know About Eutectics to Make a Good Glaze?" Digital Fire Corporation, internet article located at: http://www.digitalfire.ab.ca/cermat/education/119.php?PHPSESSID=1e2d7f3f3-a24698394ecae57ed3b06d5, Jul. 14, 2003, (4 pgs).
"Technology Education—Glass" Encyclopedia Britannica, internet article located at http://www.geocities.com/tech.sub.--ed.sub.--2000/industrial/manufacturing/glass/glass.htm?20 . . . printed May 15, 2007, (4 pgs).
"Cenospheres—Hollow Ceramic Microspheres" Sphere Services, Inc., internet article located at: http://www.sphereservices.com/ceno.html, printed May 15, 2007, (2 pgs).
Third Party Observation filed on Aug. 23, 2006 by Redco NV in EPO application No. 04700639.0-1218.
Opposition to EP-B-1330571 filed by Redco on Dec. 15, 2006 (w/Translation).
Opposition to EP-B-1330571 filed by Saint-Gobain Materiaux on Jan. 19, 2007 (w/Translation).
Letter to European Patent Office from Opponent Redco dated Aug. 1, 2008 (14 pgs, including translation).
Documents from the Examination Procedure of European Patent Application No. 05075809.3 submitted to European Patent Office on Aug. 1, 2008 by Opponent Redco.
Locher, Friedrich W. "Fundaments of Production and Application" VBT; 2000 (w/translation).
"Effect of the Extraction Temperature upon the COD value of a Cellulose Pulp" (date unknown) (author unknown) (1 pg) (w/translation).
"Pre-extraction of hemicelluloses and subsequent kraft pulping Part 1: alkaline extraction" article from TAPPI Journal (Jun. 2008) (6 pgs).
Letter to European Patent Office from Opponent Saint Gobain dated Aug. 1, 2008 (3 pgs., including translation).
Berry, Craig, "Determination of the Influence of Pulp Chemical Oxygen Demand on the Flexural Strength of Cured Fibercement" (11 pgs) (date unknown).
Extended European Search Report from the European Patent Office for EP App. No. 07008392.8, dated Oct. 8, 2007, 9 pp.
International Search Report for PCT/US05/007581.
U.S. Appl. No. 10/070,218 entitled "Extrudable Cementitious Material" filed Jul. 19, 2002; Inventor: Peter Goodwin.
U.S. Appl. No. 10/648,010 (status: abandoned in 2005); inventor: Datta; entitled "Synthetc Microspheres and Methods of Making Same" filed Aug. 25, 2003.
U.S. Appl. No. 11/026,340 (status: abandoned in 2005); inventor: Hojaji; entitled "Methods and Formulations for Producing Low Density Products" filed Dec. 29, 2004.
Elastomeric Wall Coating—Energy Seal Coatings, article located at http://www.energy-seal.com/es-home.nsf/products/everlast, (2 pgs) (date unknown).
"Forming Handsheets for Physical Tests of Pulp," TAPI, T 205 sp-95, 1995, pp. 5-7.
"Moisture in Pulp, Paper and Paperboard," TAPPI, T 412 om-94, pp. 1-3. (1994).

(56) References Cited

OTHER PUBLICATIONS

Harper, S., et al. "Resin Extraction and Effects on Pulp Quality," Proceedings of the 54th Appita Annual Conference, Melbourne, Apr. 3-6, 2000, pp. 575-580.
Stromberg, C.B., "Washing for Low Bleach Chemical Consumption," in Thomas W. Joyce (ed.), Environmental Issues: A TAPPI Press Anthology of Published Papers, TAPPI Press, Atlanta, 1990 pp. 230-238.
Stromberg, C.B. "Washing of Dissolved Organic Solids From Pulp" Paper Asia, Oct. 1994, pp. 32-39.
Scan-Test Method C 45:00 "COD and TOC Removable by Washing" Scandinavian Pulp, Paper and Board Testing Committee, Revised 2000, pp. 1-5.
Scan-Test Method CM 45:91, "Water-Soluble Organic Matter" Scandinavian Pulp, Paper and Board Testing Committee, (1991), pp. 1-4.
Hoar, T.P., "The Production and breakdown of the passivity of metals," Corrosion Science, 1967, 341-355, V.7.
Johnson, C.A. et al., "Leaching Behavior and Solubility—Controlling Solid Phases of Heavy Metals in Municipal Solid Waste Incinerator Ash," Waste Management, 1996, 129-134, V. 16 (1-3).
Joshi, P.S., et al. "Passivation of Carbon Steel Alloy in De-oxygenated Alkaline pH Media," Corrosion Science, 1993, 1367-1379, V. 34(8).
Omurtag, Y. et al. Corrosion Science "Some Investigations on the Corrosion Characteristics on Fe—Si Alloys," 1970, 225-231, V.10.
Singh, R., et al. Microporous and Mesoporous Materials, "Stabilization of Natural Faujasite Zeolite: Possible Role of Alkaline Earth Metal Ions," 1998, 103-109, V. 21.
Stolica, N., Corrosion Science, "Pitting Corrosion on Fe—Cr and Fe—Cr—Ni Alloys," 1969, 455-470, V.9.
Sukhotin, A.M. et al. Corrosion Science, "The Passivity of Iron in Acid and Alkaline Solutions," 1965, 393-407, V.5.
Tack, F.M. et al. Environmental Pollution, "Metal Solubility as a Function of pH in a Contaminated, Dredged Sediment Affected by Oxidation," 1996, 199-208, V.91.
Tourky, A.R. et al. Corrosion Science, "Further Studies on the Effect of C-content on the Corrosion and Passivity of Fe", 1968, 857-870, V.8.
Novakovsky, V.M. Electrochimica Acta, "Thermodynamic and Kinetic Causes of Passivity," 1965, 353-365, V.10.
Amaral, S.T., et al. "Passivation of Pure Iron in Alkaline Solution Containing Silicate and Sulphate—Galvanostatic and Potentiostatic Studies" Corrosion Science, 1999, 747-758, V.41.
Final office action mailed Jan. 16, 2008 in U.S. Appl. No. 10/753,089 (2004/0168615).
Response to final office action filed Oct. 31, 2007 in relation to U.S. Appl. No. 10/753,089 (2004/0168615).
Information Disclosure Statement filed Sep. 28, 2007 and Oct. 29, 2007 and initialed by Examiner in U.S. Appl. No. 10/753,089 (2004/0168615).
Drogowska, M. et al. "Influence of Anions on the Passivity Behavior of Copper in Alkaline Solutions," Surface and Coatings Technology, 1988, 383-400, V. 34.
Pending U.S. Appl. No. 10/977,344, filed Oct. 29, 2004 entitled "Manufacture and Use of Engineered Carbide and Nitride Composites"; Inventor: Giang Biscan.
International Preliminary Report on Patentability and Written Opinion of the International Searching Authority for PCT/US2006/006799, issued Aug. 28, 2007, 11 pp.
International Preliminary Report on Patentability for PCT/US2005/007581 dated Jun. 19, 2007.
Written Opinion for WO 02/028796 A2 dated May 28, 2002.
J.M. West, A.J. Majumdar and R.C. De Vekey; Lightweight glass-reinforced cement; Composites; Jan. 1980.
A.J. Majumdar, J.M. West; Fibre reinforced lightweight inorganic materials; Building Research Establishment Information Paper; Dec. 1981.
T. Wandell; Cenospheres: From Waste to Profits;The American Ceramic Society Bulletin; 75(6) Jun. 1996.
Statement of Grounds from the Australian opposition proceeding in the related Australian Patent Application No. 2006241323 dated Feb. 28, 2011.
International Search Report for PCT/AU03/01315 dated Nov. 12, 2003.
International Search Report for WO 02/028796 A2 dated May 2, 2002.
International Search Report for PCT/US2005/007581 dated Aug. 3, 2005.

FIBER CEMENT BUILDING MATERIALS WITH LOW DENSITY ADDITIVES

CROSS-REFERENCE TO RELATED APPLICATION

This application is a continuation of U.S. patent application Ser. No. 12/802,346 filed Jun. 7, 2010, which is a continuation of U.S. patent application Ser. No. 12/039,372 filed Feb. 28, 2008 (U.S. Pat. No. 7,727,329) which is a continuation of U.S. patent application Ser. No. 10/414,505 filed Apr. 15, 2003 (U.S. Pat. No. 7,658,794) which is a continuation of U.S. patent application Ser. No. 09/803,456, filed Mar. 9, 2001 (U.S. Pat. No. 6,572,697), which claims priority to and the benefit of U.S. Provisional Application No. 60/189,235, filed Mar. 14, 2000, the entire content of all applications is hereby incorporated by reference.

BACKGROUND OF THE INVENTION

1. Field of the Invention

This invention relates to building materials and methods for making the same, and more particularly to the addition of low density additives (LDA) into cementitious cellulose fiber-reinforced building materials.

2. Description of the Related Art

Fiber-reinforced cement (FRC) products such as water-resistant building sheets have been used for building since 1895. In recent history reinforcing fibers used in such products have included not only asbestos fibers, but also cellulose fibers (see Australian Patent No. 515151), metal fibers, glass fibers and other natural and synthetic fibers. Typically, the density of such building sheets is from about 1.2-1.7 $g/cm^3$, the variation in density typically being achievable by compression and dewatering of the fiber cement slurries used in manufacture and by varying the amount of fiber used. At these densities, the cement based matrix has few voids, which results in lower water absorption which has usually been considered necessary for good durability performance of cement matrices.

The densities of fiber cement described above mean the products are heavier than timber based products of equal dimension and have reduced workability. Workability encompasses the ease with which a board is handled and installed. Therefore, fiber cement building products are more difficult to cut, machine and nail than timber and timber based products. In this regard, the density of natural timber sheets typically ranges from about 0.7-0.9 $g/cm^3$ for dry hardwoods and from about 0.38-0.6 $g/cm^3$ for dry softwoods. Thus, a density-modified fiber cement material with density similar to timber may be expected to improve workability and enable lighter, more nailable, easier to cut and easier to machine products to be manufactured. However, this would have to be achieved while retaining the durability, fire resistant, rot proof and water resistant properties of fiber cement if the density modified fiber cement is to be used in the same range of applications.

Prior art describes how lightweight inorganic powders can be added as density modifiers in cement or fiber-reinforced cement materials. Low density additives for FRC products are defined as having a loose bulk density of about 0.8 $g/cm^3$ (about 50 lbs./cu.ft.) or less. The typical low density additives (LDA) used include low bulk density calcium silicate hydrates (CSH), expanded polystyrene beads (EPS), expanded vermiculite, expanded perlite, expanded shale, and expanded clay. The density modification of cement-based materials with such inorganic particles is primarily achieved by introducing porosity into the material. Typically, the pore spaces are filled with water when the material is submerged in water or exposed to rain for a length of time. This causes these materials to have poorer wet to dry dimensional stability (moisture resistance), a higher saturated mass, and poor freeze-thaw resistance.

Accordingly, there is a need for a lightweight FRC building material and method for manufacturing the same with improved wet to dry dimensional stability over that of typical density modified products. Secondly, the lightweight building material should maintain similar wet to dry dimensional stability as that of FRC products without density modifiers if the density modified material is to be used in the same range of applications. In addition, it is highly preferred in some applications that the material also have a low saturated mass, good freeze-thaw resistance, and high temperature dimensional stability. Finally, it is also desirable to have a FRC building product where lower ranges of densities closer to that of timber and timber based products can be achieved with improved durability.

SUMMARY OF THE INVENTION

Two low density additives have been evaluated that have properties more desirable to FRC building materials than typical low density additives. These two low density additives are volcanic ash and hollow ceramic microspheres. One embodiment of the invention includes the addition of volcanic ash (VA) into an FRC building material. A second embodiment comprises the addition of hollow ceramic microspheres (microspheres) into the FRC building material. A third embodiment incorporates the blending of microspheres with volcanic ash and/or other typical low density additives into the FRC building material. The third embodiment with the blend of microspheres and VA and/or other low density additives may be more preferable than the first embodiment with the introduction of volcanic ash by itself. The second embodiment with the addition of microspheres by themselves may be more preferable than either the first or third embodiments as described above, depending on the properties being considered for a particular application.

Compared to current FRC products, one advantage of the first embodiment with volcanic ash is that it provides the product with low densities and improved workability at an economical price, as well as improved dimensional stability over that of typical low density additives.

The second embodiment encompasses the addition of microspheres in fiber-cement products. Compared to current FRC products, the benefits of adding microspheres include the low density and improved workability of the product without increased moisture expansion or freeze-thaw degradation associated with the addition of lightweight inorganic materials to FRC mixes. Moreover, the addition of microspheres provides improved thermal dimensional stability for FRC material.

The third embodiment relates to the addition of microspheres in combination with VA and/or other typical low density additives in FRC material. Blending microspheres with other low density additives is advantageous because lower density FRC products can be achieved with less weight percent addition (as compared to microspheres only) due to the lower densities of VA and other typical LDA relative to microspheres. This also enables fiber cement products to achieve lower density ranges to further improve workability, while microspheres minimize the adverse effects typical low density additives have on wet-to-dry dimensional stability and overall durability.

Thus, in one aspect of the present invention, a building material is provided comprising a fiber-reinforced cement formulation and a low density additive incorporated into the formulation. The addition of the low density additive to the formulation lowers the density of the building material as compared to a building material having an equivalent fiber-reinforced cement formulation without the low density additive, while at the same time the building material with the low density additive has less than about a 20% increase in moisture expansion as compared to a building material having an equivalent fiber-reinforced cement formulation without the low density additive. More preferably, the addition of the low density additive to the formulation lowers the density of the building material as compared to a building material having an equivalent fiber-reinforced cement formulation without the low density additive, while at the same time the low density additive either maintains or decreases the moisture expansion of the building material as compared to a building material having an equivalent fiber-reinforced cement formulation without the low density additive. The density of the building material is preferably about 1.2 g/cm$^3$ or less.

In another aspect of the present invention, a building material formulation is provided to form a building product. The formulation comprises a hydraulic binder, an aggregate, fibers and volcanic ash. In one embodiment, the volcanic ash improves the workability and lowers the density of the final building product by more than about 10% as compared to a building product made from an equivalent formulation without volcanic ash. In another embodiment, the formulation with volcanic ash has a negligible difference in the moisture expansion of the final product whereby the product either maintains or increases moisture expansion by less than about 20% as compared to a building product made from an equivalent formulation without volcanic ash. For the degree of density modification achieved, this moisture movement increase is surprisingly low. With nominally the same formulation ingredients, it has been found that differences in moisture expansion for volcanic ash formulations exist. Such differences are primarily due to fluctuations in the surface area of raw materials.

In another aspect of the present invention, a method of forming a low density building material is provided. Hydraulic binder, aggregate, volcanic ash and water are mixed to create a slurry. The slurry is processed into a green shaped article. The green shaped article is cured to form the low density building material. In one embodiment, the article is cured by autoclaving. In another embodiment, the low density building material formed has a density of about 1.2 g/cm$^3$ or less, and a moisture expansion of about 0.17% or less.

In another aspect of the present invention, a building material formulation comprises a hydraulic binder, an aggregate, fibers and hollow ceramic microspheres. The final building material has a density of about 1.2 g/cm$^3$ or less. In one embodiment, about 4.1%-15% cellulose fibers are provided in the formulation. In one preferred embodiment, the microspheres lower the density of the final building product by more than about 15%, even more preferably more than about 30%, as compared to a building product made from an equivalent formulation without microspheres. In another embodiment, the microspheres decrease the moisture expansion of the final product as compared to a building product made from an equivalent formulation without microspheres, preferably by more than about 5%, more preferably by more than about 10%. In one preferred embodiment, a combination of microspheres with other additional low density additives such as volcanic ash and/or low bulk density CSH are provided in the formulation.

In another aspect of the present invention, a method of forming a low density building material, comprising mixing hydraulic binder, aggregate, fibers, hollow ceramic microspheres and water to create a slurry. The slurry is processed into a green shaped article. The green shaped article is cured to form the low density building material. The resulting building material has a density of about 1.2 g/cm$^3$ or less. In one embodiment, more than about 4% fibers are mixed to create the slurry. In another embodiment, the article is cured by autoclaving.

DETAILED DESCRIPTION OF THE PREFERRED EMBODIMENT

Figure 1:
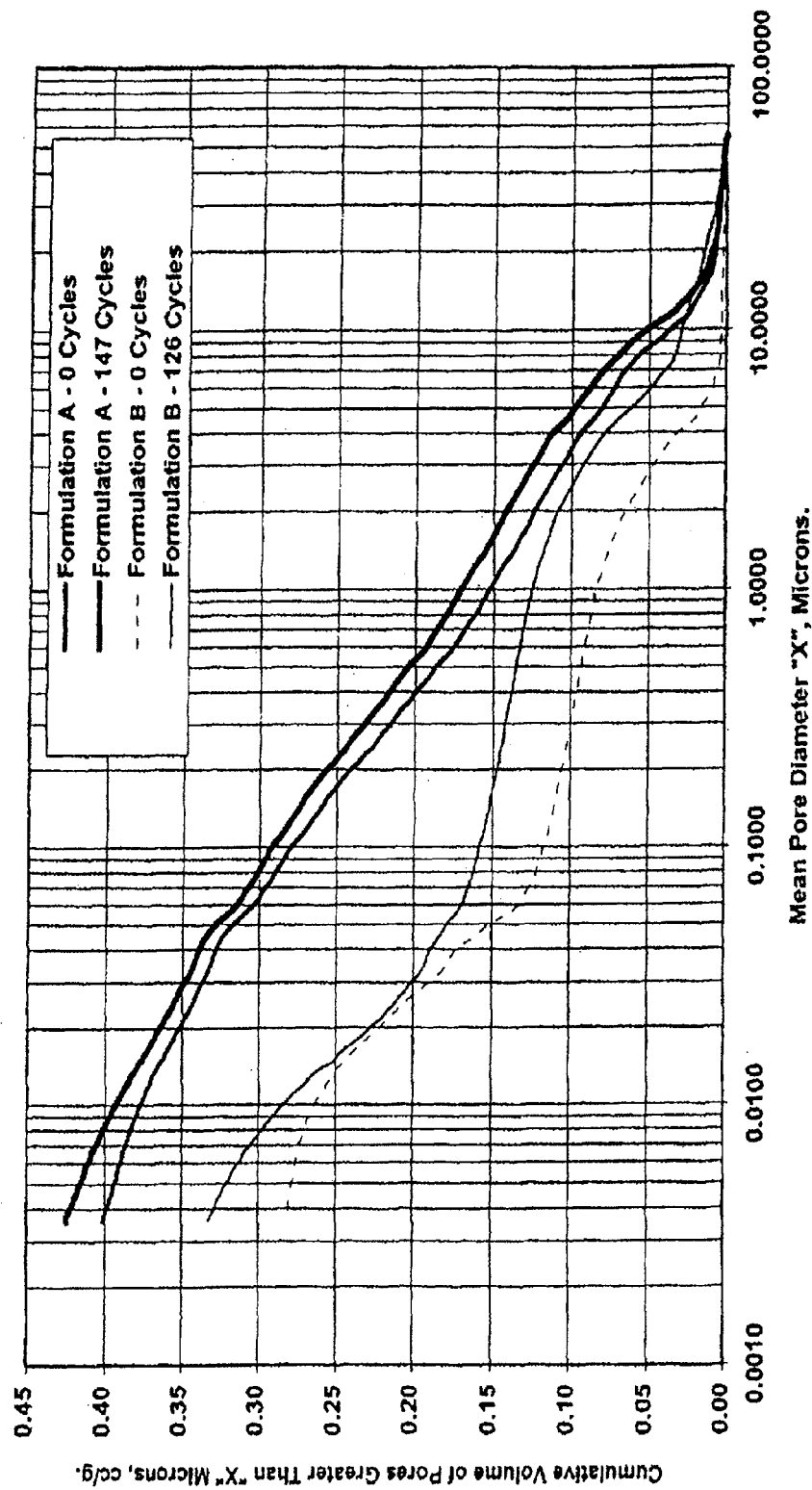
FIG. 1 is a graph of MIP pore size distribution for a Hatschek manufactured board with and without hollow ceramic microspheres after freeze-thaw testing.

The preferred embodiments of the present invention describe a fiber-reinforced cement building material incorporating at least one of two low density additives, hollow ceramic microspheres and/or volcanic ash. It will be appreciated that these additives may be used not only for the types of building materials described herein (i.e., fiber-reinforced materials), but may be used for other building materials as well. In addition, various combinations of microspheres and/or volcanic ash with other density modifiers are also contemplated to lower the density and improve the overall performance of the building material. Furthermore, other low density additives similar to hollow ceramic microspheres and volcanic ash that achieve the properties of lowering density while maintaining or decreasing moisture expansion of the final product, as well as improving workability, durability and other properties (as discussed below), are also contemplated as being within the scope of this invention.

1. First Embodiment—Volcanic Ash

In a first embodiment, this invention relates to the addition of volcanic ash into cementitious cellulose fiber reinforced building materials. Volcanic ash is also commonly referred to as "airborne perlite", "pumice" or "pumicsite". Volcanic ash is typically a natural glass derived from the magma of volcanoes during an eruption. Volcanic ash is a relatively lightweight sand sediment formed by the cooling of high temperature magma, giving rise to a material comprising about 30 wt. % crystalline minerals and 70 wt. % amorphous volcanic ash glass. It has a typical bulk density of about 25-75 lbs./cu.ft. Usually this volcanic ash is expanded with the introduction of heat to change the morphology and achieve a lighter material with a typical bulk density ranging from about 2-25 lbs./cu.ft. Expanded volcanic ash can have a wide range of particle sizes from less than about 10 microns up to about 425 microns, with median particles sizes ranging between about 20 to 100 microns. The chemical composition primarily consists of silica ($SiO_2$), alumina ($Al_2O_3$), and potassium oxides ($K_2O$).

Volcanic ash or expanded volcanic ash is available through suppliers such as Tufflite Inc. of Phoenix, Ariz.; California Industrial Minerals of Friant, Calif.; US Pumice of Chatsworth, Calif.; Amcor Precast of Idaho Falls, Id.; Hess Pumice Products of Malad City, Id.; Kansas Minerals Inc. of Mankato, Kans.; Calvert Corporation of Norton, Kans.; Copar Pumice Company of Espanola, N. Mex.; C.R. Minerals of Santa Fe, N. Mex.; Utility Block of Albuquerque N. Mex.; and Cascade Pumice of Bend, Oreg.

One preferred formulation of the first embodiment of the present invention comprises a hydraulic binder, aggregate, fiber, volcanic ash and additives. The hydraulic binder is preferably Portland cement but can also be, but is not limited to, high alumina cement, lime, ground granulated blast furnace slag cement and gypsum plasters or mixtures thereof. The aggregate is preferably ground silica sand but can also be, but is not limited to, amorphous silica, diatomaceous earth, rice hull ash, blast furnace slag, granulated slag, steel slag, mineral oxides, mineral hydroxides, clays, magnasite or dolomite, polymeric beads, metal oxides and hydroxides, or mixtures thereof. The fiber is preferably cellulose wood pulp but can also be, but is not limited to, ceramic fiber, glass fiber, mineral wool, steel fiber, and synthetic polymer fibers such as polyamides, polyester, polypropylene, polymethylpentene, polyacrylonitrile, polyacrylamide, viscose, nylon, PVC, PVA, rayon, glass ceramic, carbon or any mixtures thereof. The additives can include, but are not limited to, silica fume, geothermal silica, fire retardant, thickeners, pigments, colorants, plasticisers, dispersants, foaming agents, flocculating agents, water-proofing agents, organic density modifiers, aluminum powder, kaolin, alumina trihydrate, mica, metakaolin, calcium carbonate, wollastonite, polymeric resin emulsions, or mixtures thereof.

Volcanic ash can be used in a variety of building products all having different proportions of hydraulic binder, aggregate, volcanic ash and additives to obtain optimal properties for a particular application (e.g., siding, roofing, trim, soffit, backerboard for tile underlay, etc.). It will be appreciated that the percentage of volcanic ash may be varied depending on the desired application. One preferred composition may include about 5%-80% Portland cement, about 0%-80% silica, about 4.1%-15% cellulose, about 0%-10% additives and about 2%-50% volcanic ash. One particular example of a typical formulation with volcanic ash is as follows:

| Portland Cement (binder) | 28% |
| Silica (aggregate) | 54% |
| Cellulose (fiber) | 7% |
| Metal Hydroxide (additive) | 4% |
| Volcanic Ash (LDA) | 7%. |

Preferably, the cement and silica have a fineness index of about 200 to 450 $m^2/kg$. The fineness index for both cement and silica is tested in accordance with ASTM C204-96a.

The material may be formed into a green shaped article from a waterborne mixture or slurry by a number of conventional processes as would be known to one of skill in the art, such as the:
Hatschek sheet process;
Mazza pipe process;
Magnani process;
Injection molding;
Extrusion;
Hand lay-up;
Molding;
Casting;
Filter pressing;
Flow on machine, roll forming, etc.

with or without post pressing. The processing steps and parameters used to achieve the final product using a Hatschek process are described in Australian Patent No. 515151.

The material is preferably pre-cured for up to 80 hours, most preferably 24 hours or less, to establish the formulation to set. The material is then air-cured (approximately 28 days) or more preferably, autoclaved at an elevated temperature and pressure in a steam saturated environment at 120 to 180° C. for 3 to 30 hours, most preferably 24 hours or less. The length and time chosen for curing is dependent on the formulation, the manufacturing process, and the form of the article.

Test Results
Density & Workability

The addition of volcanic ash in fiber cement materials lowers density and improves overall workability properties at an economical price while reducing the moisture expansion observed with that of typical low density additives. Products with volcanic ash are lighter, and therefore easier to handle, nail, and score and snap to the desired dimensions. Formulations with volcanic ash also reduce edge cracking or crumbling (if any) when the board is nailed close to the edge (e.g., ⅜-¾"). Tables 1 and 2 below illustrate FRC formulations and test results for these formulations, more particularly demonstrating the advantages of adding volcanic ash to lower density and improve workability.

TABLE 1

Formulations for Table 2 Test Results

| Formula Identification | Portland Cement Hydraulic Binder | Silica Aggregate | Cellulose Fiber | Metal Hydroxide Additive | Expanded Volcanic Ash LDA |
|---|---|---|---|---|---|
| B | 28.7 | 60.3 | 7.0 | 4.0 | |
| K | 28.7 | 52.8 | 7.0 | 4.0 | 7.5 |

TABLE 2

Comparison of Properties With and Without Volcanic Ash

| Test Method | Formulation K[1] 7.5% Volcanic Ash | Formulation B Control No LDA |
|---|---|---|
| Oven Dry (O.D.) Density ($g/cm^3$) | 1.11 | 1.34 |
| Nail Penetration (Equilibrium conditions)[2] mm. of nail in material 50 mm (2 in.) = length of nail | 45.4 | 33.0 |
| Standard Deviation | 1.1 | 1.0 |

[1]7.5 wt. % of the aggregate from the control, Formulation B, has been displaced by 7.5% Volcanic Ash for Formulation K.
[2]Equilibrium conditions - samples are conditioned in a controlled atmosphere of 73 ± 4° F. and 50 ± 5% humidity. Refer to text below for definition and description of nail penetration test.

Table 2 above compares test results of 10"×10" filter pressed prototype boards with and without volcanic ash. Prototype boards are produced by mixing the desired formulation with a Hobart Mixer to form a homogenous slurry. The slurry is then compressed between two steel dewatering plates at 3500 psi for one minute with a Wabash Press (model #PC-75-4TM) to form a monolithic sheet. The slurry is supported with steel wire mesh screens (30 to 40 US mesh) placed underneath and on top of the slurry mix within the steel frame mold. The monolithic sheet is then pre-cured for a minimum of about 12 hours and autoclaved at an elevated temperature and pressure in a steam saturated environment at 150° C. for about 12 hours.

In Table 2, Formulation K with 7.5 wt. % volcanic ash lowers the density by about 17% from 1.34 g/cm³ to 1.11 g/cm³ when compared to an equivalent formulation, Formulation B, the control formulation, without volcanic ash. An equivalent formulation is herein defined as one in which the preferred LDA (e.g., volcanic ash) is displaced by an equivalent percentage of binder, aggregate and/or additives, and more preferably is displaced by an equivalent percentage of aggregate. This lowered density also improves the nailability, or ease of driving a nail into the board. Testing showed an increase in nail penetration from 33.0 mm to 45.4 mm, where 50 mm represents the length of the nail and therefore the maximum nail penetration attainable. Nail penetration testing consists of nailing a layered stack of board using a Paslode Impulse® cordless framing hardware gun (positive placement) to ensure consistent nailing pressure. The layered stack typically comprises ¼-½" thick board stacked to a height greater than the length of the nail (2 in. or 50 mm). Senco 6d galvanized clipped head nails (part #GC21AABN) were used.

Thus, in one embodiment, as compared to a typical building sheet having a density of about 1.3 g/cm³, the building material formulation described above results in a final product having a density of less than about 1.2 g/cm³. More preferably, the addition of volcanic ash to the building material formulation can preferably be adjusted to give a final product density of about 1.2 g/cm³ or less, or about a 10% or more reduction in density as compared to an equivalent formulation without volcanic ash. It is further contemplated that larger additions of volcanic ash will further lower the density of the building product.

Wet-Dry Dimensional Stability

Cured fiber cement formulations with conventional density modifiers have increased moisture expansion and increased moisture absorption on a percentage weight increase basis compared to FRC formulations with no LDA. One advantage of the first embodiment over prior art is that the addition of volcanic ash attains the desired density and workability with less moisture expansion than other conventional low density additives when introduced on a similar weight percent basis. Wet-dry dimensional stability is desired in building products for quality and durability of the installed product, especially in exterior applications subject to severe climatic changes. Good dimensional stability minimizes any gaps that may open between sheets or lengths of building panel or plank. Good dimensional stability also reduces the likelihood of sheet cracking due to developed stress between the dimensionally changing panel or plank and the supporting framework that the product is fastened.

Tables 3 and 4 below illustrate FRC formulations and test results for these formulations, more particularly demonstrating the advantages of adding volcanic ash to lower density while minimizing moisture expansion typical of other low density additives added on an equivalent weight basis.

TABLE 3

Formulations for Table 4 Test Results

| Formula Identification | Portland Cement Hydraulic Binder | Silica Aggregate | Cellulose Fiber | Metal Hydroxide Additive | Expanded Volcanic Ash LDA | Expanded Perlite LDA |
|---|---|---|---|---|---|---|
| B | 28.7 | 60.3 | 7.0 | 4.0 | | |
| K | 28.7 | 52.8 | 7.0 | 4.0 | 7.5 | |
| L | 28.7 | 55.3 | 7.0 | 4.0 | | 5.0 |

TABLE 4

Moisture Expansion[1] Comparison of Volcanic Ash & Perlite

| Formulation | Description | O.D. Density (g/cm³) | Moisture Expansion % | % Moisture Expansion Increase from Control |
|---|---|---|---|---|
| B[2] | Control- No LDA | 1.33 | 0.18 ± 0.02 | |
| K[3] | 7.5% VA | 1.11 | 0.17 ± 0.02 | −5.5 |
| L | 5% Perlite | 1.22 | 0.22 ± 0.02 | 22.2 |

[1]Moisture expansion is the change in product length from saturated to oven dry conditions. The % change moisture expansion equation is:
$$\frac{\text{Length}_{initial} - \text{Length}_{final}}{\text{Length}_{final}} \times 100.$$

[2]Throughout this description of the preferred embodiments Formulation B is used for the control. However, as no one sample incorporating Formulation B is used for all of the tests, nominal differences may be found in the test results for any one sample. 7.5 wt. % of the aggregate from the control, Formulation B, has been displaced by 7.5% Volcanic Ash for Formulation K.

Table 4 above displays test results of 10"×10" filter-pressed prototype boards comparing formulations with 7.5 wt. % volcanic ash and 5.0% perlite (Harborlite 2000 from Harborlite Corp.), a typical low density additive. Formulation L with 5.0% perlite has a 22.2% increase in moisture expansion from the control whereas Formulation K with 7.5% volcanic ash actually shows a decrease of more than about 5% in moisture expansion from the control.

Thus, the addition of volcanic ash provides better dimensional stability than typical density modifiers at equivalent or lower weight percent additions. This allows volcanic ash to achieve lower densities and better workability properties with equivalent or higher additions of volcanic ash relative to conventional low density additives.

More preferably, the addition of volcanic ash can be adjusted to show a negligible difference in moisture expansion as compared to an equivalent formulation without volcanic ash. In one embodiment, the volcanic ash preferably will increase the moisture expansion of the final product by less than about 20% compared to a building product formed from an equivalent formulation without volcanic ash, and will more preferably decrease the moisture expansion of the final product. In one preferred embodiment, the moisture expansion of a building product made from a formulation having volcanic ash is about 0.17% or less.

2. Second Embodiment—Hollow Ceramic Microspheres

A second embodiment of this invention encompasses the addition of hollow ceramic microspheres into cementitious cellulose fiber-reinforced building materials. This second embodiment with hollow ceramic microspheres may be preferred over the first embodiment including volcanic ash because the addition of microspheres in FRC materials has even better moisture resistance coupled with other durability advantages, including freeze-thaw resistance, and thermal dimensional stability. It will be appreciated that the preferred embodiments for the second embodiment are not limited to these types of microspheres or building materials. Thus, other types of fillers and building materials are also contemplated.

Microspheres can be natural, synthetic or a by-product. The material can be crystalline but is more typically amorphous or glass. One preferred type of microspheres are hollow ceramic microspheres commonly known as cenospheres. Cenospheres are a coal ash by-product that is typically separated from fly ash by a floatation process where the spheres float to the surface of water from clarifiers, ponds or lakes. The microspheres are available, for example, under the names Extendospheres®, Recyclospheres® and Zeeospheres®, and are available from suppliers such as PQ Corporation of Chattanooga, Tenn.; Zeelan Industries Inc./3M of St. Paul, Minn.;

Sphere Service, Inc. of Oak Ridge, Tenn.; and Advanced Cement Technologies (A.C.T.) of Blaine, Wash.

The microspheres have typical particle sizes ranging from about 12 to 300 microns, with median particle sizes ranging about 80 to 120 microns. These sizes can, of course, vary between samples. The preferred microspheres typically contain about 62%-65% silica ($SiO_2$), about 23%-26% alumina ($Al_2O_3$) and about 3.0% to 4.0% iron oxides ($Fe_2O_3$). When introduced into a building material, the microspheres introduce pores in the material that may not readily fill with water which is advantageous to the material because of a lower saturated mass, improved wet to dry dimensional stability and improved freeze-thaw resistance.

One preferred formulation of the second embodiment comprises a hydraulic binder, aggregate, fiber, hollow ceramic microspheres and additives. It will be appreciated that the various components of the preferred formulation for the second embodiment can include any of the aforementioned materials listed for each component in the first embodiment. The material may also be produced by a number of conventional processes and curing conditions as listed and described in the first embodiment. If applicable, the preferences of the raw materials, processes, steps or conditions are similar to that of the first embodiment.

The microspheres can be used in a variety of building products all having different proportions of hydraulic binder, aggregate, microspheres and additives to obtain optimal properties for a particular application (e.g., siding, roofing, trim, soffit, backerboard for tile underlay, etc.). One preferred composition may include about 5%-80% Portland cement, about 0%-80% silica, about 4.1%-15% cellulose, about 0%-10% additives and about 2%-90% microspheres. One particular example of a typical formulation with microspheres is as follows:

| | |
|---|---|
| Portland Cement (binder) | 28.7% |
| Silica (aggregate) | 50.3% |
| Cellulose (fiber) | 7% |
| Metal Hydroxide (additive) | 4% |
| Microspheres (LDA) | 10%. |

It will be appreciated that the percentage of microspheres may be varied depending on the desired application. For instance, high addition percentages (up to about 90 wt. %) of microspheres may be suitable for building materials and systems that require some type of fire resistance rating. The high addition of microspheres provides the material with low thermal shrinkage.

Test Results

Density

Lowering the density with microspheres improves the overall workability of thicker products without compromising the advantages fiber cement products offer with regard to durability (i.e., dimensional stability) and structural integrity. These attributes are particularly advantageous for product thicknesses above about three eighths of an inch (>3/8"). The products with microspheres are lighter and therefore easier to handle. Secondly, products with microspheres are easier to nail and score/snap to the desired dimension. Furthermore, microsphere formulations reduce edge cracking or crumbling (if any) when the board is nailed close to the edge (e.g., 3/8-5/8").

Tables 5 and 6 below display formulations and test results for FRC formulations, more particularly illustrating the advantages of adding microspheres to a formulation to improve density and workability.

TABLE 5

Formulations for Table 6 Test Results

| Formula Identification | Portland Cement Hydraulic Binder | Silica Aggregate | Cellulose Fiber | Metal Hydroxide Additive | Microspheres LDA |
|---|---|---|---|---|---|
| B | 28.7 | 60.3 | 7.0 | 4.0 | |
| A | 28.7 | 50.3 | 7.0 | 4.0 | 10.0 |

TABLE 6

Comparison of Properties With and Without Microspheres

| Test Method | Formulation A[1] 10% Microspheres | Formulation B Control No LDA |
|---|---|---|
| Density (Equilibrium Conditions)[2] ($g/cm^3$) | 1.16 | 1.39 |
| Nail Penetration (Equilibrium conditions) mm. of nail in material 50 mm (2 in.) = length of nail | 47.0 | 31.7 |
| standard deviation | 0.9 | 1.4 |

[1]10% microspheres in Formulation A replace 10% of the aggregate in the control, Formulation B.
[2]Equilibrium conditions- samples are conditioned in a controlled atmosphere of 73 ± 4° F. and 50 ± 5% humidity.

Table 6 displays test results of 3'×5' Hatschek manufactured board for Formulations A and B. Formulation A with 10 wt. % microspheres reduces the density by about 15% from 1.39 $g/cm^3$ to 1.16 $g/cm^3$ when compared to an equivalent formulation without microspheres (Formulation B). In addition, the ease of driving a nail into the board is improved. Testing revealed an increase in nail penetration from 31.7 mm to 47.0 mm, where 50 mm represents the length of the nail and the maximum nail penetration attainable.

Overall, testing of prototypes and products produced from trials has revealed about a 15% decrease in density for every 10% addition of microspheres and significant improvements in nailing. Thus, the addition of microspheres may advantageously be used to reduce the density of FRC building material by more than about 15%, even more preferably more than about 30%, as compared to an equivalent formulation without microspheres. The present inventors contemplate that with the addition of microspheres, the density of the material can be reduced to about 0.9 $g/cm^3$ (see Table 10 below), and more preferably, even as low as about 0.5 $g/cm^3$.

Wet-Dry Dimensional Stability

As stated earlier, cured fiber cement formulations with conventional density modifiers have increased moisture expansion and increased moisture absorption on a percentage weight increase basis. One advantage of the preferred embodiments over prior art is that the addition of microspheres to reduce density does not increase moisture expansion from wet to dry. This is useful for a number of reasons previously mentioned in the first embodiment.

Table 7 below displays test results of 3'×5' Hatschek manufactured board with and without microspheres. Formulation A with 10% microspheres maintains, or more preferably reduces moisture expansion from that of Formulation B without microspheres. Formulations A and B are in Table 5 above.

TABLE 7

Comparison of Moisture Expansion With and Without Microspheres

| Test Method | Formulation A[1] 10% Microspheres | Formulation B Control No LDA |
|---|---|---|
| Density (Equilibrium Conditions)[2] (g/cm$^3$) | 1.16 | 1.39 |
| Moisture Expansion % Change | 0.15 ± 0.02 | 0.16 ± 0.02 |

[1]10% microspheres in Formulation A replace 10% of the aggregate in the control, Formulation B.
[2]Equilibrium conditions - samples are conditioned in a controlled atmosphere of 73 ± 4° F. and 50 ± 5% humidity.

Tables 8-10 below display formulations and test results for 10"×10" filter pressed prototype boards comparing microspheres with conventional density modifiers that do increase moisture expansion. Conventional density modifiers include low bulk density calcium silicate hydrate (CSH), and expanded polystyrene, vermiculite, perlite, shale or clay.

TABLE 8

Formulations for Tables 9 and 10 Test Results

| Formula Identification | Portland Cement Hydraulic Binder | Silica Aggregate | Cellulose Fiber | Metal Hydroxide Additive | Microspheres LDA | Low Bulk Density CSH LDA | Expanded Perlite LDA |
|---|---|---|---|---|---|---|---|
| B | 28.7 | 60.3 | 7.0 | 4.0 | | | |
| C | 35.2 | 52.8 | 8.0 | 4.0 | | | |
| D | 26.8 | 40.2 | 8.0 | | 25.0 | | |
| E | 26.8 | 40.2 | 8.0 | | | | 25.0 |
| F | 28.7 | 55.3 | 7.0 | 4.0 | | 5.0 | |

Table 9 data below displays a conventional low density additive, low bulk density CSH (Silasorb from Celite Corp.), at a 5% load that increases moisture expansion from that of the control, Formulation B.

TABLE 9

Moisture Expansion of Low Bulk Density CSH

| Formula Identification | Description | Equilibrium Density[1] (g/cm$^3$) | Moisture Expansion % |
|---|---|---|---|
| B | Control | 1.41 | 0.162 ± 0.02 |
| F[2] | 5.0% low bulk density CSH | 1.27 | 0.188 ± 0.02 |

[1]Equilibrium conditions- samples are conditioned in a controlled atmosphere of 73 ± 4° F. and 50 ± 5% humidity
[2]5% low bulk density CSH in Formulation F replaces 5% of the aggregate in the control, Formulation B.

Table 10 below compares two formulations with the same base formula, one with 25 wt. % microspheres and the other with 25 wt. % perlite (Aztec XX from Aztec Perlite). Both the perlite and microsphere formulations decrease the density of control Formulation C from 1.3 g/cm$^3$ to around 0.9 g/cm$^3$, but moisture expansion increases with the perlite formulation and decreases with the microsphere formulation.

TABLE 10

Moisture Expansion Comparison of Microspheres & Perlite

| Formulation | Description | Equilibrium Density[1] (g/cm$^3$) | Moisture Expansion % |
|---|---|---|---|
| C | Control | 1.31 | 0.230 ± 0.02 |
| D[2] | 25% Microspheres | 0.90 | 0.202 ± 0.02 |
| E[2] | 25% Perlite | 0.89 | 0.275 ± 0.02 |

[1]Equilibrium conditions- samples are conditioned in a controlled atmosphere of 73 ± 4° F. and 50 ± 5% humidity
[2]For formulations D and E, microspheres displace both the aggregate and hydraulic binder in the control, Formulation C.

Thus, the addition of microspheres to the fiber cement formulation has the effect of maintaining or reducing moisture expansion of the final product. Preferably, the addition of microspheres can be adjusted to reduce the moisture expansion by about 5%, more preferably by about 10% or more, as compared to an equivalent formulation without microspheres.

Freeze-Thaw Resistance

Freeze-thaw resistance refers to a material's resistance to damage when exposed to repeated cycles of freezing and thawing. For instance, concrete can be damaged by frost, and especially by repeated cycles of freezing and thawing. Damage usually begins with flaking at the surface, and gradually extends inward, though deep cracks may occur. Damage associated with freezing generally does not occur unless a sufficient quantity of water is present in the pores, and is minimal in dense concrete of low water-to-cement ratio and low permeability.

Similar to high density concrete, freeze-thaw damage is minimal in high-density fiber cement. In the preferred embodiments, the addition of microspheres into a FRC formulation produces a lower density cured product that maintains freeze-thaw resistance, unlike prior art where density modifiers added to the formulation reduce a material's freeze-thaw resistance.

Figure 2:
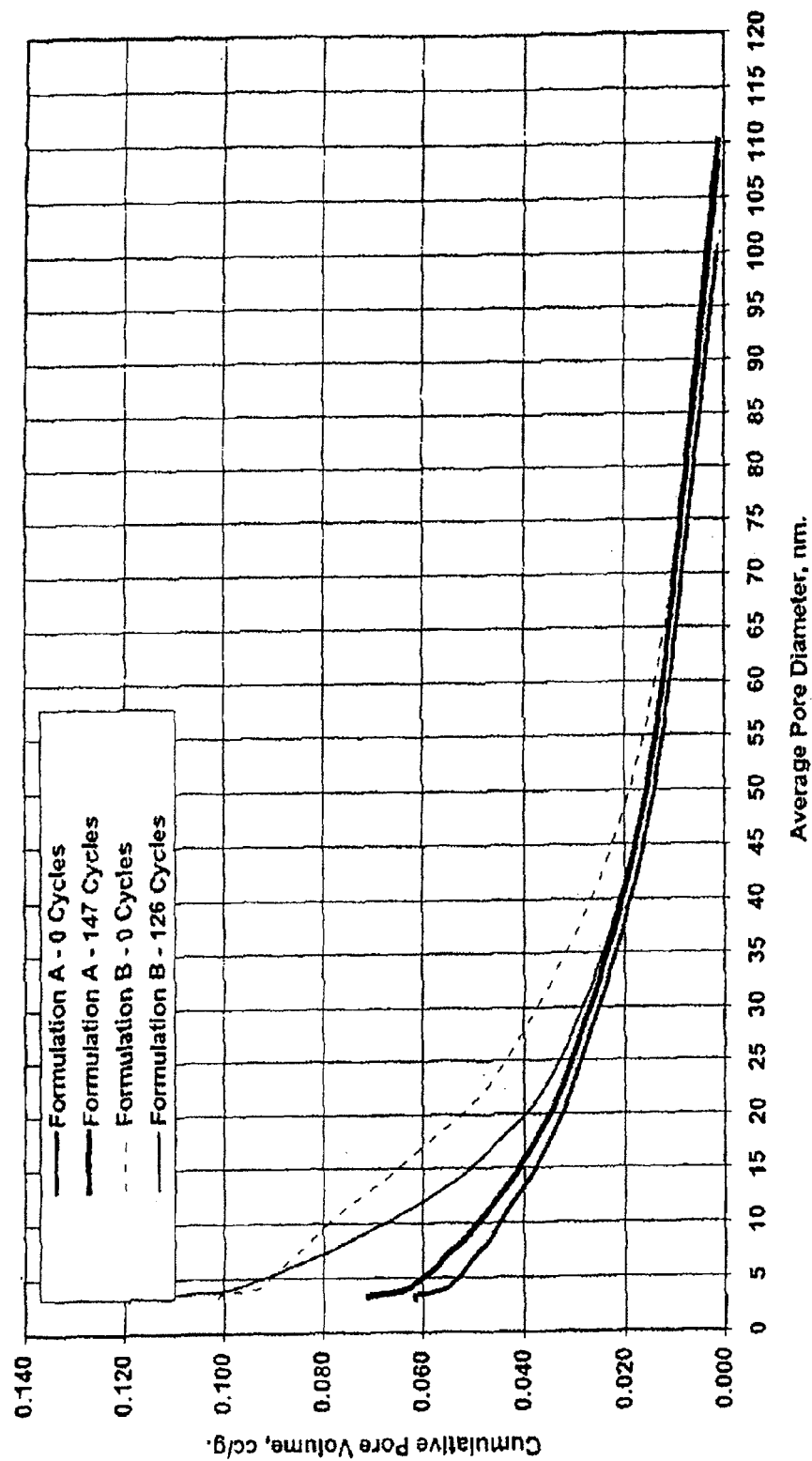
FIG. 2 is a graph of BET pore size distribution for a Hatschek manufactured board with and without hollow ceramic microspheres after freeze-thaw testing.

FIGS. 1 and 2 display pore size distribution graphs of 3'×5' Hatschek manufactured board using MIP (mercury intrusion porosimetry) and BET (Brunauer, Emmett and Teller) methods. There is less change in pore size distribution for Formulation A with 10 wt. % microspheres after 147 freeze-thaw cycles than Formulation B without microspheres after 126 cycles. This demonstrates the microsphere formulation's resistance to structural change typical of freeze-thaw damage. To further support the microsphere formulation's resistance to freeze-thaw damage, FIG. 3 displays a SEM (scanning electron microscope) picture of a Hatschek manufactured board (3'×5') with 10 wt. % microspheres showing no signs of degradation after 147 freeze-thaw cycles whereas other wood cement composites would typically have degradation at this stage.

Figure 3:
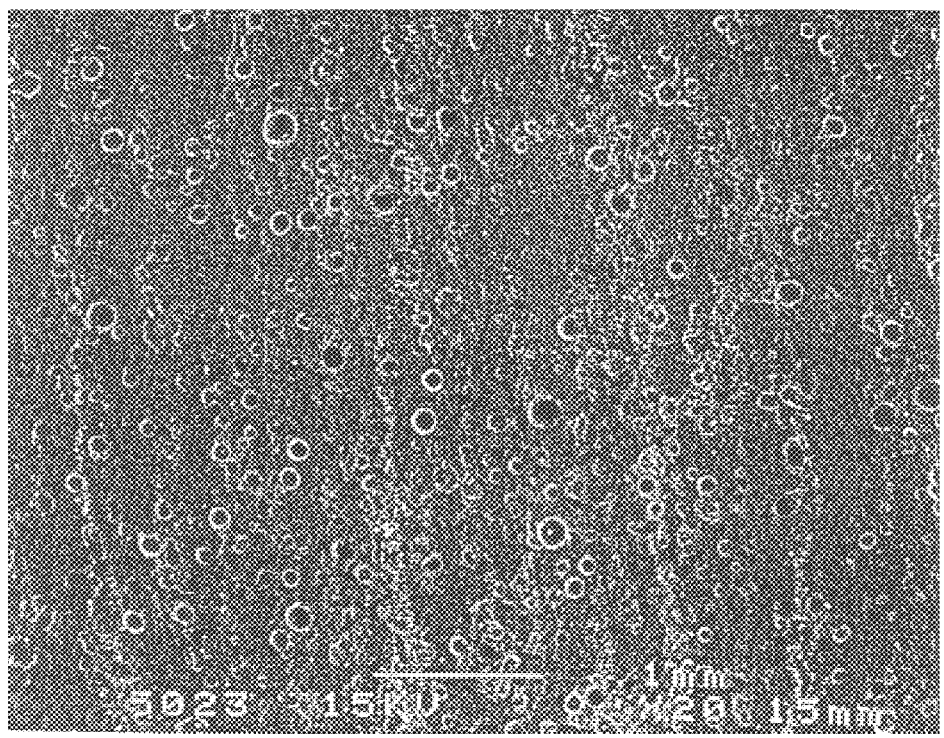
FIG. 3 is an SEM photograph illustrating a Hatschek manufactured board with 10 wt. % hollow ceramic microspheres showing no degradation after 147 freeze-thaw cycles.

Freeze-thaw testing of FIG. 3 was performed in accordance with ASTM (American Standard Test Method) C666A titled "Standard Test Method for Resistance of Concrete to Rapid Freezing and Thawing." This test method has two different procedures, A or B. Procedure A was followed, meaning samples were submerged in water for both rapid freezing and thawing as opposed to rapid freezing in air and rapid thawing in water (procedure B). Samples are periodically removed from freeze-thaw cycling and visually inspected for degradation such as cracking, moisture expansion, sponginess/wetting throughout the sample, and overall structural integrity. Samples are moved from freeze-thaw cycling when the degree of degradation is such that the sample does not hold together and would therefore not be functional as a building product.

High Temperature Dimensional Stability

Reducing a building material's thermal shrinkage prevents high temperature stresses and strains from occurring on building components. This improved thermal-dimensional stability allows building components in building fires to maintain a shield to fire without cracking, falling apart and allowing fire to spread quickly.

Tables 11 and 12 below display FRC formulations and test results for 10"×10" filter-pressed prototype boards, more particularly illustrating the advantages of adding microspheres to a formulation to improve high temperature dimensional stability.

TABLE 11

Formulations for Table 12 Test Results

| Formula Identification | Portland Cement Hydraulic Binder | Silica Aggregate | Cellulose Fiber | Metal Hydroxide Additive | Microspheres | Low Bulk Density CSH LDA |
|---|---|---|---|---|---|---|
| A | 28.7 | 50.3 | 7.0 | 4.0 | 10.0 | |
| B | 28.7 | 60.3 | 7.0 | 4.0 | | |
| F | 28.7 | 55.3 | 7.0 | 4.0 | | 5.0 |
| G | 28.7 | 50.3 | 7.0 | 4.0 | | 10.0 |
| H | 28.7 | 40.3 | 7.0 | 4.0 | 20.0 | |

TABLE 12

Thermal Shrinkage Comparison of Microspheres & Low Bulk Density CSH

| Formulation | Description | Equilibrium Density[2] (g/cm$^3$) | Thermal Shrinkage[1] (%) |
|---|---|---|---|
| B | Control | 1.41 | 3.07 |
| F[3] | 5.0% low bulk density CSH | 1.21 | 7.27 |
| G[3] | 10.0% low bulk density CSH | 1.15 | 8.09 |
| A[3] | 10.0% microspheres | 1.15 | 4.41 |
| H[3] | 20.0% microspheres | 1.01 | 4.21 |

[1]Refer to text below for description of thermal shrinkage test.
[2]Equilibrium conditions- samples are conditioned in a controlled atmosphere of 73 ± 4° F. and 50 ± 5% humidity.
[3]The percent LDA in formulations F, G, A & H replace an equivalent percent of aggregate in the control, Formulation B.

At lower load levels (e.g., about 10-20%), microspheres minimize the high temperature thermal shrinkage that occurs when typical inorganic density modifiers are introduced in fiber-cement formulations. Table 12 displays results of the percent thermal shrinkage obtained for Formulation A with 10 wt. % microspheres versus Formulation G with 10 wt. % low bulk density CSH (Silasorb from Celite Corp). Compared to the control (Formulation B), both formulations reduce density from about 1.4 to 1.15 g/cm$^3$, but the formulation with low bulk density CSH has almost twice the thermal shrinkage as the formulation with microspheres. Moreover, Formulation H with 20.0 wt. % microspheres and a density of about 1.0 g/cm$^3$ has over 40% less thermal shrinkage than Formulation F with only 5.0% low bulk density CSH (Silasorb from Celite Corp.) and a higher density of about 1.2 g/cm$^3$.

High temperature thermal shrinkages were determined using a Thermomechanical Analyzer (TMA). Samples were cut to 10 by 25 mm with up to 12 mm thickness. The temperature of the saturated samples was ramped up at a rate of 20° C./minute to 950° C. and sample dimensions were measured with a macroexpansion probe. Thermal shrinkage was taken as the overall dimensional change from 25° to 950° C., and reported as a percentage of total initial length.

Another advantage of using microspheres in fiber-cement formulations is thermal shrinkage decreases as microsphere additions increase. Thermal shrinkage with microspheres is inversely proportional to the weight percent added, whereas thermal shrinkage with conventional density modifiers is directly proportional to the weight percent added. Thus, formulations with higher additions of microspheres (up to about 90 wt. %) have lower thermal shrinkage than formulations with lower additions (up to about 20 wt. %).

Table 13 below provides formulations with high additions of microspheres and Table 14 provides the high temperature thermal shrinkage results. Formulations I and J with 70 and 90 wt. % microsphere additions produce thermal shrinkage results of about 2.7% and 1.1%, respectively. Thermal shrinkage for Formulations I and J were determined by cutting samples approximately 10×10×40 mm long, oven drying, firing for one hour at 1000° C. with a muffle furnace, and allowing to cool to oven dry conditions. The percent thermal shrinkage was determined by measuring the overall difference in length from oven dry to 1000° C., and dividing by the initial oven dry length.

TABLE 13

Formulations For Table 14 Results

| Formula Identification | Portland Cement Hydraulic Binder | Silica Fume Aggregate | Cellulose Fiber | Microspheres LDA |
|---|---|---|---|---|
| I | 26.2 | 2.9 | 0.9 | 70.0 |
| J | 8.7 | 1.0 | 0.3 | 90.0 |

TABLE 14

Thermal Shrinkage of High-Addition Microsphere Formulations

| Formula Identification | Thermal Shrinkage % |
|---|---|
| I | 2.7 |
| J | 1.1 |

Thus, in an embodiment where 20% microspheres are used in the fiber cement formulation, the thermal shrinkage of the final product as compared to an equivalent product made from a formulation without microspheres increases by less than about 50%. As described above, with increasing percentages of microspheres, the percent thermal shrinkage decreases, even to a point where, as compared to a product without microspheres, the final product with microspheres exhibits a lower thermal shrinkage, preferably lower from about 10% to about 70%. More particularly, the thermal shrinkage of the product with microspheres is preferably less than about 4%.

3. Third Embodiment—Microspheres and Other Additives

A third embodiment of this invention relates to the addition of hollow ceramic microspheres in combination with volcanic ash and/or other low density additives in cementitious cellulose fiber-reinforced building materials. Descriptions of volcanic ash and hollow ceramic microspheres are found in the detailed descriptions of the first and second embodiments, respectively. The third embodiment with a blend of microspheres and low density additives may be more preferable than the first embodiment with VA given FRC products can achieve a lower range of densities with improved moisture resistance and durability properties. However, the second embodiment with the independent addition of microspheres may be preferable to this third embodiment because of the superlative durability properties offered by the independent addition of microspheres. The preference of the second embodiment to the third embodiment is dependent on the relative importance of durability in a particular application.

Similar to the first and second embodiments, one preferred formulation of the third embodiment comprises of a hydraulic binder, aggregate, fiber, hollow ceramic microspheres, low density additives and other additives. It will be appreciated that the various components of the third embodiment can include any of the aforementioned materials listed for each component in the first embodiment. The third embodiment may also be produced by a number of conventional processes and curing conditions as listed and described in the first embodiment. If applicable, the preferences of the raw materials, processes, steps or conditions are similar to that of the first embodiment.

The blending of microspheres with VA and/or low density additives can be used in a variety of building products all having different proportions of hydraulic binder, aggregate, low density additives, and other additives to obtain optimal properties for the particular application (e.g., siding, roofing, trim, soffit, backerboard for tile underlay, etc.). One preferred composition of the third embodiment could include about 5%-80% Portland cement, about 0%-80% silica, about 4.1%-15% cellulose, about 0%-10% additives and about 2%-60% microspheres and other typical LDA. One particular example of a typical formulation with a blend of microspheres and a typical low density additive is as follows:

| | |
|---|---|
| Portland Cement (binder) | 28.7% |
| Silica (aggregate) | 50.3% |
| Cellulose (fiber) | 7% |
| Metal Hydroxide (additive) | 4% |
| Microspheres (LDA) | 10% |
| Volcanic Ash (LDA) | 5% |

It will be appreciated that the percentage of microspheres and other LDA's including VA may be varied depending on the desired application.

Test Results

Lower Densities with Durability

There are several advantages to blending microspheres with VA or other typical low density modifiers such as low bulk density CSH, or expanded polystyrene beads, clay, vermiculite, perlite, and shale. One advantage is that an equivalent or lower density can be achieved with less total weight percent addition (than microspheres only) given the lower densities of VA and other typical LDA compared to microspheres. The lower addition rates with the blend are more economical, and the microspheres minimize moisture expansion associated with the addition of typical inorganic density modifiers. Another advantage to blending microspheres with other typical low density additives is that FRC products can achieve lower density ranges and still maintain sufficient product strength for handling. Thus, higher load levels (on a percent weight basis) of the combination of microspheres and other LDA can be added while minimizing the adverse effects typical low density additives have on dimensional stability and overall durability.

The addition of low density additives in all of the embodiments described herein is not the only means of reducing density in cement based formulations, however. Formulations consisting of cement and aggregate without fiber or low density additives have densities typically ranging from about 1.8 to 2.1 g/cm$^3$. Adding fiber to cement formulations is advantageous because fiber also lowers density in addition to providing strength and products suitable for nailing. Densities for fiber cement formulations with greater than about 4 wt. % fiber typically range from about 1.2 to 1.4 g/cm$^3$. It has been found that FRC formulations with about 4 wt. % or less fiber do not have sufficient strength and ductility for installation. These FRC products are often too brittle and nailing produces cracks or blowouts during installation. Alternatively, fiber additions greater than about 15 wt. % may in some applications be undesirable because fiber in FRC formulations contributes to moisture expansion, increased permeability, and overall compromises in durability.

Figure 4:
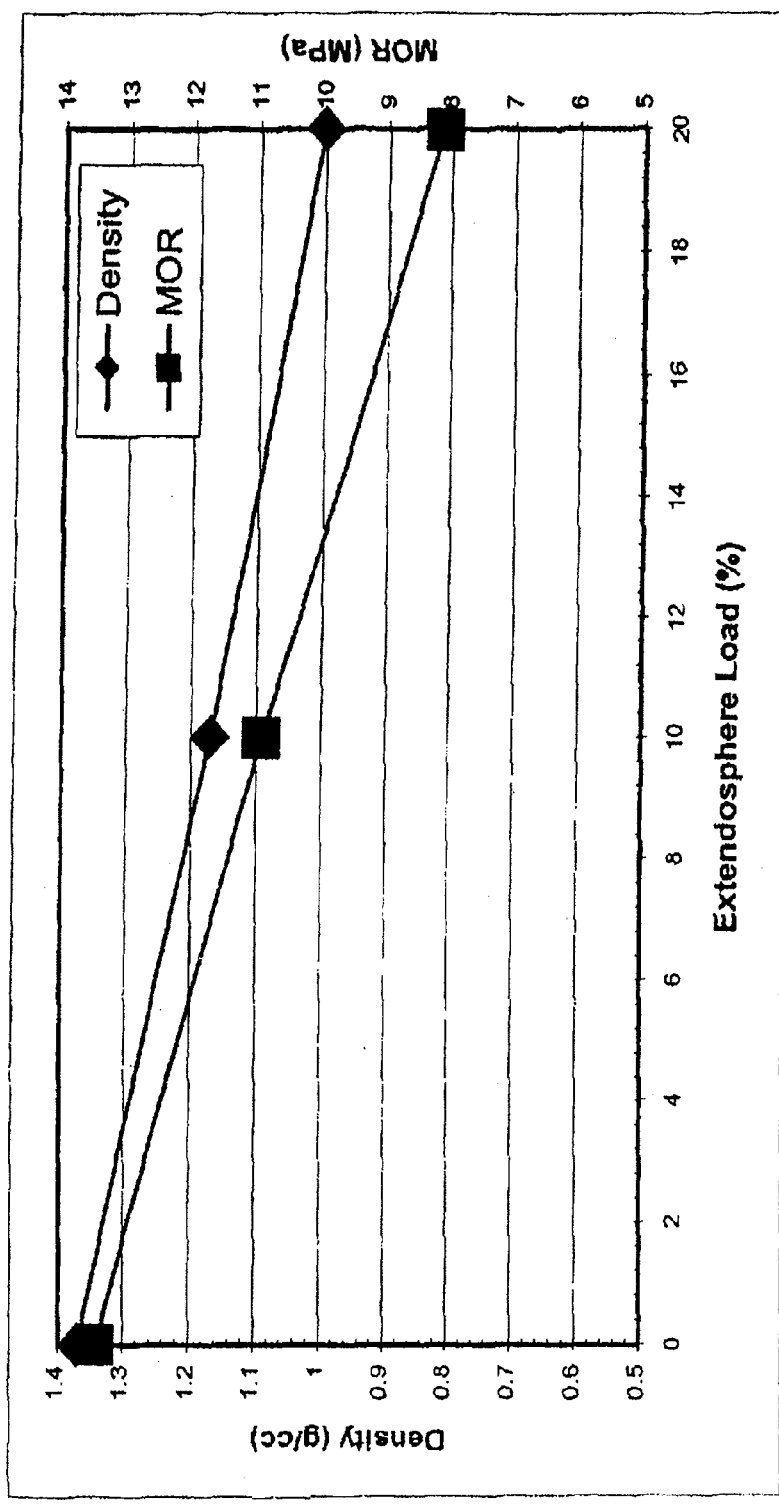
FIG. 4 is a graph illustrating the relationship between low density additive addition, density and strength.

Thus, the right balance of fiber is advantageously determined for a FRC product, which is dependent on the thickness and shape of the particular product. In one embodiment, fiber percentages of about 4.1% to 15% are preferable. Low density additives are added to the FRC formulation to provide additional reductions in density from that of the fiber addition. However, in general, the higher the addition of LDA, the lower the strength properties of the FRC product. Therefore, LDA additions are limited because FRC products should preferably maintain a minimum strength for sufficient handling and installation. The maximum LDA addition is dependent on a multitude of factors such as the LDA, the load level of the specific LDA, and the shape of the particular FRC product. The minimum strength required is also dependent on the FRC product's shape and thickness. FIG. 4 displays a typical relationship of microsphere wt. % additions to density and strength of 10"×10" filter-pressed prototype boards.

Tables 15-17 below illustrate FRC formulations and test results of 10"×10" filter-pressed prototype boards, more particularly illustrating the advantages of blending microspheres with other low-density additives to achieve lower density ranges and improve durability.

TABLE 15

Formulations for Tables 16 and 17

| Formula Identification | Portland Cement Hydraulic Binder | Silica Aggregate | Cellulose Fiber | Metal Hydroxide Additive | Microspheres LDA | Low Bulk Density CSH LDA |
|---|---|---|---|---|---|---|
| B | 28.7 | 60.3 | 7.0 | 4.0 | | |
| G | 28.7 | 50.3 | 7.0 | 4.0 | | 10.0 |
| M | 28.0 | 49.0 | 7.0 | 4.0 | 12.0 | |
| N | 28.4 | 49.6 | 7.0 | 4.0 | 6.0 | 5.0 |
| O | 28.7 | 51.3 | 7.0 | 4.0 | 6.0 | 3.0 |

Table 16 compares the densities of Formulation M with 12 wt. % microspheres, Formulation O with a 9 wt. % blend of microspheres and low bulk density CSH, and the control without low density additives. The low bulk density CSH used in Formulation 0 is produced by James Hardie using a process with silica, lime and water that results in a low bulk density material that is substantially CSH in tobermorite form. Further details are described in U.S. patent application Ser. No. 09/058,444 filed Apr. 9, 1998, the entirety of which is hereby incorporated by reference. Relative to the control, the decreases in density for Formulations M and O are not significantly different, but the total addition of low density additives with the blend (Formulation O) is 3% less than formulation M with only microspheres. For Formulations M and O, the subtle differences in wt. % of hydraulic binder and aggregate do not have an impact on density properties.

TABLE 16

Density Comparisons

| Formula Identification | Description | O.D. Density (g/cm$^3$) |
|---|---|---|
| B | Control- No LDA | 1.31 |
| M[1] | 12% Microspheres | 1.09 |
| O[1] | 6% Microspheres 3% Low Bulk Density CSH | 1.11 |

[1]The percent LDA in Formulations M and O replace an equivalent percent of aggregate and/or binder in the control with no LDA, Formulation B.

Table 17 below displays test results of 10"×10" filter-pressed prototype boards with four formulations containing variances primarily only in additions of various low density additives, and a control without any low density additives. Results show that Formulation M with 12 wt. % microspheres reduces density from that of the control from 1.35 g/cm$^3$ to 1.16 g/cm$^3$, but Formulation N with 11 wt. % addition of the microspheres/low bulk density CSH (Silasorb from Celite) blend lowers the density further to 1.10 g/cm$^3$. Moreover, moisture expansion for Formulation N with the 11 wt. % microspheres/low bulk density CSH blend and the control without low density additives is not significantly different at 0.167 and 0.163%, respectively. In comparison, Formulation G with only 10 wt. % low bulk density CSH provides about the same density as Formulation N's 11 wt. % blend, but with a notably higher moisture expansion of 0.197%. The subtle wt. % differences of hydraulic binder and aggregate in the formulations do not have an impact on density or moisture expansion properties.

TABLE 17

Moisture Expansion Comparisons

| Formula Identification | Description | O.D. Density (g/cm$^3$) | Moisture Expansion % |
|---|---|---|---|
| B | Control -No LDA | 1.35 | 0.163 ± 0.02 |
| M | 12% Microspheres | 1.16 | 0.156 ± 0.02 |
| N | 6% Microspheres 5% Low Bulk Density CSH | 1.10 | 0.167 ± 0.02 |
| G | 10% Low Bulk Density CSH | 1.12 | 0.197 ± 0.02 |

[1]The percent LDA in Formulations M, N and G replace an equivalent percentage of aggregate and/or binder in the control with no LDA, Formulation B.

Conclusions

In general, it will be appreciated that the preferred embodiments of the present invention, more particularly, a fiber-reinforced building material containing additives of volcanic ash, hollow ceramic microspheres, or a combination of microspheres, volcanic ash and/or other additives, have several advantages over the prior art. These materials have a low density compared to conventional fiber cement building products. This enables production of a thicker product (e.g., ⅜" to 1.0") that is lighter and therefore easier to handle, cut, nail and install.

The materials also have improved wet-dry dimensional stability and the building material's durability is improved such that building panels do not excessively shrink and crack. Also, excessive gaps between panels or planks do not open up after changes in humidity or from wet to dry seasons.

With respect to at least the formulations and building products incorporating hollow ceramic microspheres, the materials' freeze-thaw resistance is maintained at lower density, unlike most inorganic density modified fiber cement materials. This gives these materials good durability in climates that experience frequent freezing and thawing conditions.

These materials incorporating microspheres also have improved fire resistance properties because of improved thermal dimensional stability relative to typical low density additives. Thus, the materials are stable in building fires as a building component such that the material can maintain a shield to fire without cracking and falling apart and allowing fire to spread quickly.

The preferred embodiments have applicability to a number of building product applications, including but not limited to building panels (interior and exterior), tile backer board (walls and floors), siding, soffit, trim, roofing, fencing and decking. The embodiments illustrated and described above are provided merely as examples of certain preferred embodiments of the present invention. Various changes and modifications can be made from the embodiments presented herein by those skilled in the art without departure from the spirit and scope of the invention.

What is claimed is:

1. A Hatschek manufactured board, comprising:
about 5%-80% of Portland cement;
about 0%-80% silica;
a plurality of hollow microspheres, said hollow microspheres having a median particle size between 20 to 120 micrometers, wherein the hollow microspheres are dispersed in the Hatschek manufactured board to introduce pores in the board, said hollow microspheres comprising about 62%-65% silica, about 23%-26% alumina, and about 3%-4% iron oxide; and
wherein the hollow microspheres lower the density of the Hatschek manufactured board to less than 1.2 g/cm$^3$.

2. The Hatschek manufactured board of claim 1, wherein the density of the Hatschek manufactured board is about 0.9 to 1.1 g/cm$^3$.

3. The Hatschek manufactured board of claim 1, wherein the median particle size of the microspheres is between about 80 and 120 micrometers.

4. The Hatschek manufactured board of claim 1, wherein hollow microspheres comprises about 2% to 90 wt. % of the Hatschek manufactured board.

5. The Hatschek manufactured board of claim 1 further comprising about 0%-30% calcium silicate hydrate.

* * * * *